(12) United States Patent
Koide

(10) Patent No.: US 12,446,391 B2
(45) Date of Patent: Oct. 14, 2025

(54) DETECTION DEVICE

(71) Applicant: Magnolia White Corporation, Tokyo (JP)

(72) Inventor: Gen Koide, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 458 days.

(21) Appl. No.: 17/859,251

(22) Filed: Jul. 7, 2022

(65) Prior Publication Data

US 2023/0028839 A1    Jan. 26, 2023

(30) Foreign Application Priority Data

Jul. 13, 2021    (JP) .................. 2021-115989

(51) Int. Cl.
| | |
|---|---|
| *H10K 30/81* | (2023.01) |
| *H10K 65/00* | (2023.01) |
| *G06V 40/13* | (2022.01) |
| *H10K 102/00* | (2023.01) |

(52) U.S. Cl.
CPC ............ *H10K 30/81* (2023.02); *H10K 65/00* (2023.02); *G06V 40/1318* (2022.01); *H10K 2102/311* (2023.02)

(58) Field of Classification Search
None
See application file for complete search history.

(56) References Cited

U.S. PATENT DOCUMENTS

| | | | |
|---|---|---|---|
| 2009/0027358 A1 | 1/2009 | Hosono | |
| 2017/0301718 A1* | 10/2017 | Chou | ............. H04N 25/704 |
| 2021/0012082 A1 | 1/2021 | Uchida et al. | |
| 2021/0225939 A1 | 7/2021 | Nozawa et al. | |
| 2021/0313384 A1* | 10/2021 | Tada | ............. H10F 39/198 |
| 2021/0374378 A1 | 12/2021 | Kobayashi et al. | |
| 2022/0139978 A1 | 5/2022 | Kamei | |
| 2022/0173174 A1* | 6/2022 | Hatsumi | ............. G09G 3/30 |

FOREIGN PATENT DOCUMENTS

| | | |
|---|---|---|
| JP | 2007-081203 A | 3/2007 |
| JP | 2009-032005 A | 2/2009 |
| JP | 2015-015415 A | 1/2015 |
| JP | 2019-174963 A | 10/2019 |

(Continued)

OTHER PUBLICATIONS

Office Action issued in related Japanese Patent Application No. 2021-115989, mailed Sep. 17, 2024. 8 pages.

*Primary Examiner* — Hung K Vu
(74) *Attorney, Agent, or Firm* — K&L Gates LLP

(57) ABSTRACT

According to an aspect, a detection device includes: a substrate; a plurality of first electrodes arranged on a first principal surface of the substrate; a plurality of photodiodes provided corresponding to the first electrodes, and each including a first carrier transport layer, an active layer, and a second carrier transport layer; a second electrode provided across the photodiodes; a backlight provided on a second principal surface side opposite to the first principal surface of the substrate; a plurality of light-blocking layers provided between the backlight and the photodiodes; and a light-transmitting area formed between adjacent light-blocking layers of the light-blocking layers.

17 Claims, 16 Drawing Sheets

(56) References Cited

FOREIGN PATENT DOCUMENTS

| JP | 2020-102555 A | 7/2020 | |
|----|---------------|--------|---|
| WO | WO2020/075002 A1 | 4/2020 | |
| WO | WO2020/166309 A1 | 8/2020 | |
| WO | WO2020/170703 A1 | 8/2020 | |
| WO | WO-2020165686 A1 * | 8/2020 | ............. G02B 5/003 |

* cited by examiner

DETECTION DEVICE

This application claims the benefit of priority from Japanese Patent Application No. 2021-115989 filed on Jul. 13, 2021, the entire contents of which are incorporated herein by reference.

BACKGROUND

1. Technical Field what is disclosed herein relates to a detection device.

2. Description of the Related Art

Optical sensors capable of detecting fingerprint patterns and vascular patterns are known (for example, Japanese Patent Application Laid-open Publication No. 2009-032005). Among such optical sensors, sensors are known each including a plurality of photodiodes each including an organic semiconductor material used as an active layer.

Such optical sensors are required to achieve good detection accuracy while reducing the overall size of a device including a light source. Various structures are known as examples of an arrangement relation between an object to be detected, such as a finger, and the light source that emits light to the object to be detected. For example, in a configuration in which the light source is disposed above the object to be detected, that is, in a configuration in which the object to be detected is interposed between an optical sensor and the light source, the module structure may be complicated and difficult to be downsized. For another example, in a configuration in which the light source is disposed on a lateral side of the object to be detected, the in-plane distribution of the amount of light detected by the optical sensor may be enlarged.

For the foregoing reasons, there is a need for a detection device capable of obtaining excellent detection accuracy while being smaller in size.

SUMMARY

According to an aspect, a detection device includes: a substrate; a plurality of first electrodes arranged on a first principal surface of the substrate; a plurality of photodiodes provided corresponding to the first electrodes, and each including a first carrier transport layer, an active layer, and a second carrier transport layer; a second electrode provided across the photodiodes; a backlight provided on a second principal surface side opposite to the first principal surface of the substrate; a plurality of light-blocking layers provided between the backlight and the photodiodes; and a light-transmitting area formed between adjacent light-blocking layers of the light-blocking layers.

DETAILED DESCRIPTION

Figure 1:
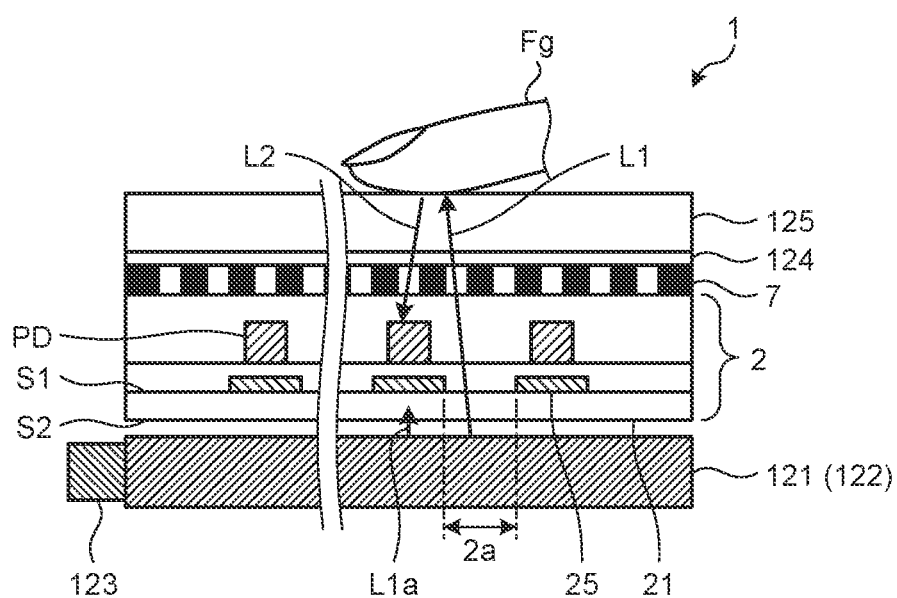
FIG. 1 is a sectional view illustrating a schematic sectional configuration of a detection device according to a first embodiment.

The following describes modes (embodiments) for carrying out the present invention in detail with reference to the drawings. What is disclosed herein is not limited to the description of the embodiments given below. Components described below include those easily conceivable by those skilled in the art or those substantially identical thereto. In addition, the components described below can be combined as appropriate. The present disclosure is merely an example. The present disclosure naturally encompasses appropriate modifications easily conceivable by those skilled in the art while maintaining the gist of the present disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In the present specification and claims, in expressing an aspect of disposing another structure on or above a certain structure, a case of simply expressing "on" includes both a case of disposing the other structure immediately on the certain structure so as to contact the certain structure and a case of disposing the other structure above the certain structure with still another structure interposed therebetween, unless otherwise specified.

First Embodiment

FIG. 1 is a sectional view illustrating a schematic sectional configuration of a detection device according to a first embodiment. As illustrated in FIG. 1, a detection device 1 includes an array substrate 2, a light guide portion 7, an adhesive layer 124, a cover member 125, and a backlight 121. The backlight 121, the array substrate 2, the light guide portion 7, the adhesive layer 124, and the cover member 125 are stacked in this order in a direction orthogonal to a first principal surface S1 of the array substrate 2.

The array substrate 2 is formed using a sensor base member 21 as a base. The array substrate 2 includes a plurality of light-blocking layers 25 and a plurality of photodiodes PD provided on the first principal surface S1 side of the sensor base member 21. The configuration of the array substrate 2 illustrated in FIG. 1 is merely schematically illustrated, and a detailed configuration of each of the light-blocking layers 25 and each of the photodiodes PD included in the array substrate 2 will be described later with reference to FIGS. 8 and 9.

The light guide portion 7 is disposed so as to face the photodiodes PD and is disposed between the photodiodes PD and an object to be detected, such as a finger Fg. The light guide portion 7 has a plurality of light guide paths and a light-blocking portion provided around the light guide paths. At least some of the light guide paths overlap the photodiodes PD. The light-blocking portion has higher optical absorbance than that of the light guide paths. The light guide portion 7 is an optical element that transmits a component of light L2 reflected from the object to be detected, such as the finger Fg, which travels in a predetermined direction toward the photodiodes PD. The light guide portion 7 is also called collimating apertures or a collimator. The light guide portion 7 is not limited to a configuration in which the light guide paths are formed in a shape of columns, and various configurations can be applied thereto.

The cover member 125 is a member for protecting the array substrate 2 and the light guide portion 7 and covers the array substrate 2 and the light guide portion 7. The cover member 125 is a glass substrate, for example. The cover member 125 is not limited to a glass substrate and may be, for example, a resin substrate, or may be made up of a plurality of layers obtained by stacking these substrates. The cover member 125 is bonded to a surface of the light guide portion 7 with the adhesive layer 124 interposed therebetween. However, the adhesive layer 124 need not be provided. Alternatively, the cover member 125 need not be provided. In this case, the surface of the array substrate 2 and the light guide portion 7 is provided with a protective layer of, for example, an insulating film, and the finger Fg contacts the protective layer of the detection device 1.

The backlight 121 is disposed so as to face a second principal surface S2 opposite to the first principal surface S1 of the sensor base member 21. The backlight 121 includes, for example, a light guide plate 122 and a plurality of light sources 123 arranged at one end of the light guide plate 122. Light emitted from the light sources 123 of the backlight 121 travels in the light guide plate 122, and rays of light L1 and L1a as portions of the emitted light are emitted from the light guide plate 122 toward the object to be detected, such as the finger Fg. For example, light-emitting diodes (LEDs) for emitting light in a predetermined color are used as the light sources.

In the present embodiment, the array substrate 2 has light-blocking areas serving as areas overlapping the light-blocking layers 25 and various types of wiring, and a light-transmitting area 2a that does not overlap the light-blocking layers 25 and the various types of wiring. The light-blocking layers 25 are arranged between the backlight 121 and the photodiodes PD in the direction orthogonal to the first principal surface S1. In other words, in the detection device 1, the backlight 121, the light-blocking layers 25, and the photodiodes PD are stacked in this order in the light-blocking areas.

In the light-transmitting area 2a, the light L1 of the light emitted from the backlight 121 passes through the light-transmitting area 2a of the array substrate 2 and is emitted toward the object to be detected such as the finger Fg. The light L2 reflected by the object to be detected, such as the finger Fg, is received by the photodiodes PD through the light guide portion 7. In contrast, in the light-blocking areas, the light L1a of the light emitted from the backlight 121 is blocked by the light-blocking layers 25 and is not emitted toward the photodiodes PD and the object to be detected such as the finger Fg above the light-blocking layers 25.

With this configuration, the photodiodes PD of the detection device 1 are mainly irradiated by the light L2 reflected by the object to be detected such as the finger Fg, and light other than the light L2 from the object to be detected, such as the finger Fg (for example, the light L1a directly emitted from the backlight 121), can be restrained from irradiating the photodiodes PD. Thus, the detection device 1 having the backlight 121 can improve the detection accuracy.

The light L1 emitted from the light sources 123 is mainly reflected by a surface of the object to be detected such as the finger Fg and is incident on the photodiodes PD. As a result, the detection device 1 can detect a fingerprint by detecting a shape of asperities on the surface of the finger Fg or the like. A portion of the light L1 emitted from the light sources 123 is instead reflected in the finger Fg or the like, and is incident on the photodiodes PD. As a result, the detection device 1 can detect information on a living body in the finger Fg or the like. Examples of the information on the living body include a pulse wave, pulsation, and a vascular image of the finger or a palm. That is, the detection device 1 may be configured as a fingerprint detection device to detect the fingerprint or a blood-vessel detection device to detect a vascular pattern of, for example, veins. The light L1 emitted from the light sources 123 is set to have a wavelength (in a range from a visible light region to a near-infrared light region) according to a detection target. The light sources 123 are not limited to one type, and a plurality of types having different wavelengths may be provided.

The configuration of the backlight 121 is merely an example and may be changed as appropriate. For example, the light sources 123 are not limited to being arranged at one end of the light guide plate 122 and may be arranged at both ends of the light guide plate 122. Any of various optical sheets, such as prism sheets and light diffusion sheets, may be stacked on a surface of the light guide plate 122 facing the second principal surface S2. The backlight 121 is not limited to the configuration including the light guide plate 122. For example, if the detection device 1 is configured as a flexible sensor, a flexible organic light-emitting diode (OLED) light source can be employed as the backlight 121. The flexible OLED light source includes a flexible light source base member and organic electroluminescent (EL) devices (OLEDs) formed as light sources on the light source base member.

Figure 2:
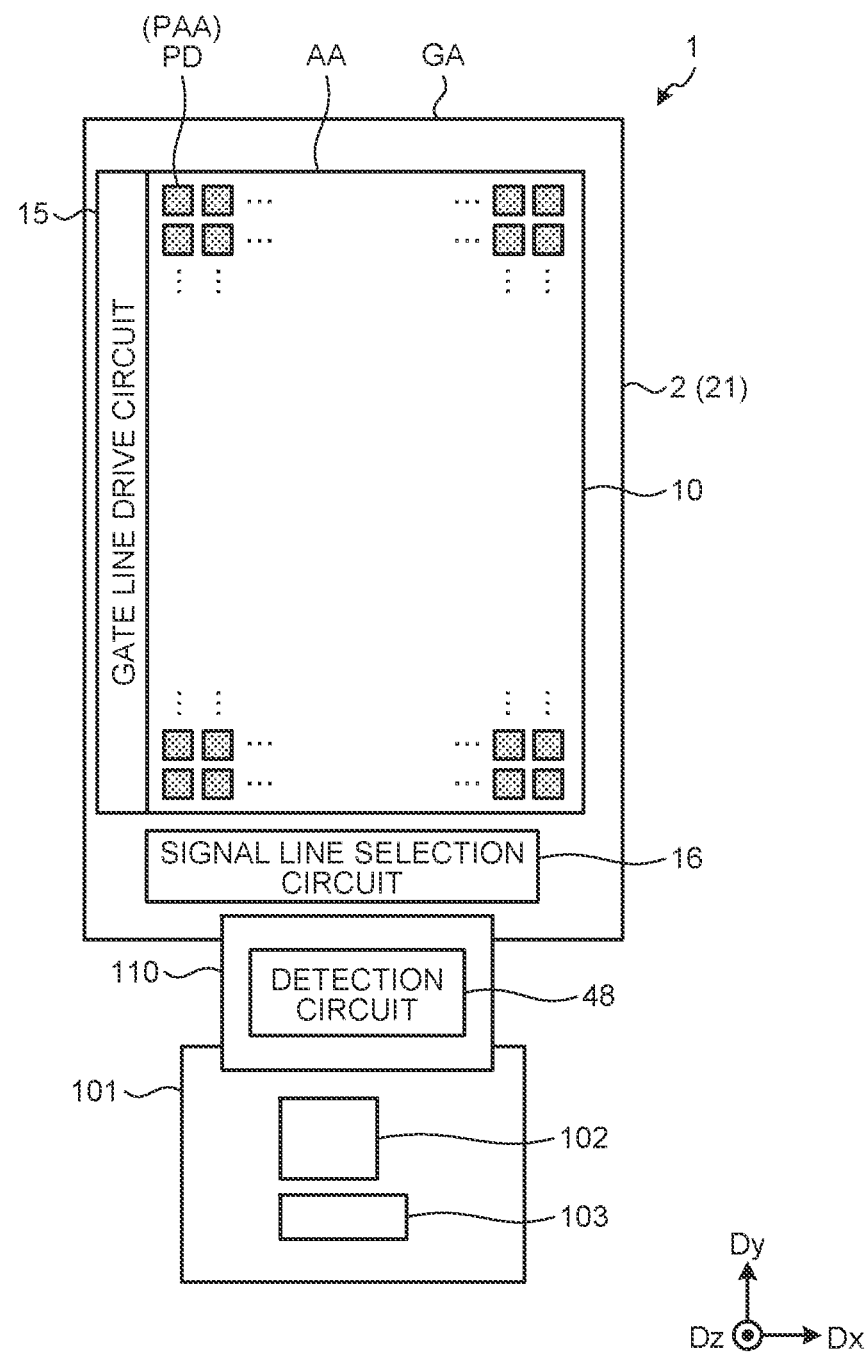
FIG. 2 is a plan view illustrating the detection device according to the first embodiment.

FIG. 2 is a plan view illustrating the detection device according to the first embodiment. As illustrated in FIG. 2, the detection device 1 includes the sensor base member 21 (array substrate 2), a sensor 10, a gate line drive circuit 15, a signal line selection circuit 16, a detection circuit 48, a control circuit 102, and a power supply circuit 103.

The sensor base member 21 is electrically coupled to a control substrate 101 through a flexible printed circuit board 110. The flexible printed circuit board 110 is provided with the detection circuit 48. The control substrate 101 is provided with the control circuit 102 and the power supply circuit 103. The control circuit 102 is, for example, a field-programmable gate array (FPGA). The control circuit 102 supplies control signals to the sensor 10, the gate line drive circuit 15, and the signal line selection circuit 16 to control a detection operation of the sensor 10. The control circuit 102 supplies control signals to the backlight 121 (refer to FIG. 1) to control lighting and non-lighting of the light sources 123. The power supply circuit 103 supplies voltage signals including, for example, a sensor power supply signal (sensor power supply voltage) VDDSNS (refer to FIG. 4) to the sensor 10, the gate line drive circuit 15, and the signal line selection circuit 16. The power supply circuit 103 supplies a power supply voltage to the light sources 123.

The sensor base member 21 has a detection area AA and a peripheral area GA. The detection area AA is an area provided with the photodiodes PD included in the sensor 10. The peripheral area GA is an area between the outer perimeter of the detection area AA and ends of the sensor base member 21, and is an area not provided with the photodiodes PD.

The gate line drive circuit 15 and the signal line selection circuit 16 are provided in the peripheral area GA. Specifically, the gate line drive circuit 15 is provided in an area extending along a second direction Dy in the peripheral area GA. The signal line selection circuit 16 is provided in an area extending along a first direction Dx in the peripheral area GA and is provided between the sensor 10 and the detection circuit 48.

In the following description, the first direction Dx is one direction in a plane parallel to the sensor base member 21. The second direction Dy is one direction in the plane parallel to the sensor base member 21 and is a direction orthogonal to the first direction Dx. The second direction Dy may non-orthogonally intersect the first direction Dx. A third direction Dz is a direction orthogonal to the first direction Dx and the second direction Dy and is a direction normal to the first principal surface S1 of the sensor base member 21. The term "plan view" refers to a positional relation when viewed from a direction orthogonal to the sensor base member 21.

A plurality of partial detection areas PAA of the sensor 10 are each an optical sensor including the photodiode PD as a sensor element. The photodiode PD is a photoelectric conversion element and outputs an electric signal corresponding to light irradiating each of the photodiodes PD. More specifically, the photodiode PD is an organic photo diode (OPD). The partial detection areas PAA (photodiodes PD) are arranged in a matrix having a row-column configuration in the detection area AA.

Figure 3:
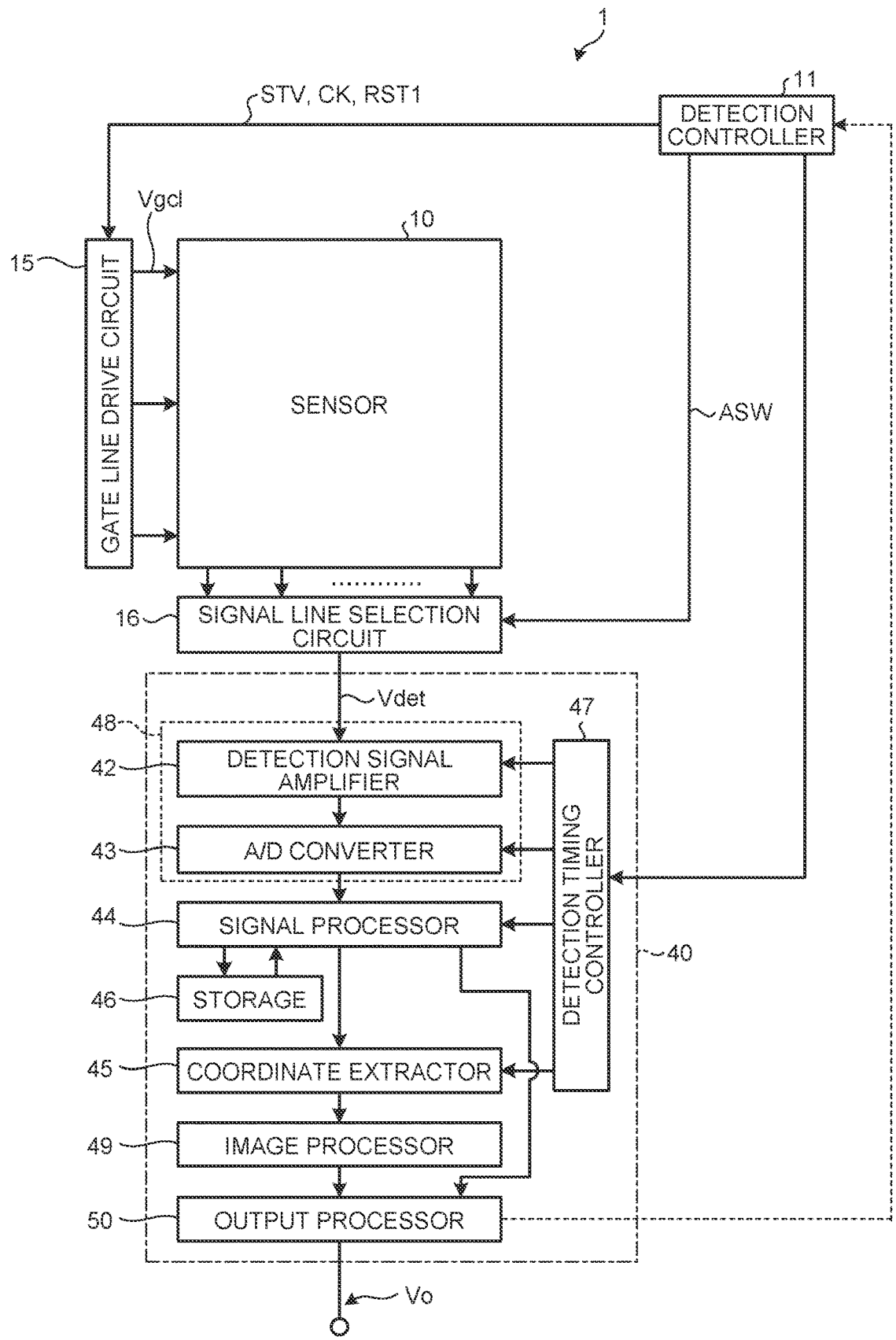
FIG. 3 is a block diagram illustrating a configuration example of the detection device according to the first embodiment.

FIG. 3 is a block diagram illustrating a configuration example of the detection device according to the first embodiment. As illustrated in FIG. 3, the detection device 1 further includes a detection controller (detection control circuit) 11 and a detector (detection signal processing circuit) 40. The control circuit 102 includes one, some, or all of the functions of the detection controller 11. One, some, or all of the functions of the detector 40 other than those of the detection circuit 48 are also included in the control circuit 102.

The sensor 10 includes the photodiodes PD. Each of the photodiodes PD included in the sensor 10 outputs an electric signal corresponding to light irradiating the photodiode PD as a detection signal Vdet to the signal line selection circuit 16. The sensor 10 performs the detection in response to a gate drive signal Vgcl supplied from the gate line drive circuit 15.

The detection controller 11 is a circuit that supplies respective control signals to the gate line drive circuit 15, the signal line selection circuit 16, and the detector 40 to control operations thereof. The detection controller 11 supplies various control signals such as a start signal STV, a clock signal CK, and a reset signal RST1 to the gate line drive circuit 15. The detection controller 11 also supplies various control signals such as a selection signal ASW to the signal line selection circuit 16. The detection controller 11 also supplies various control signals to the backlight 121 to control the lighting and the non-lighting of the light sources 123.

The gate line drive circuit 15 is a circuit that drives a plurality of gate lines GCL (refer to FIG. 4) based on the various control signals. The gate line drive circuit 15 sequentially or simultaneously selects the gate lines GCL and supplies the gate drive signals Vgcl to the selected gate lines GCL. By this operation, the gate line drive circuit 15 selects the photodiodes PD coupled to the gate lines GCL.

Figure 4:
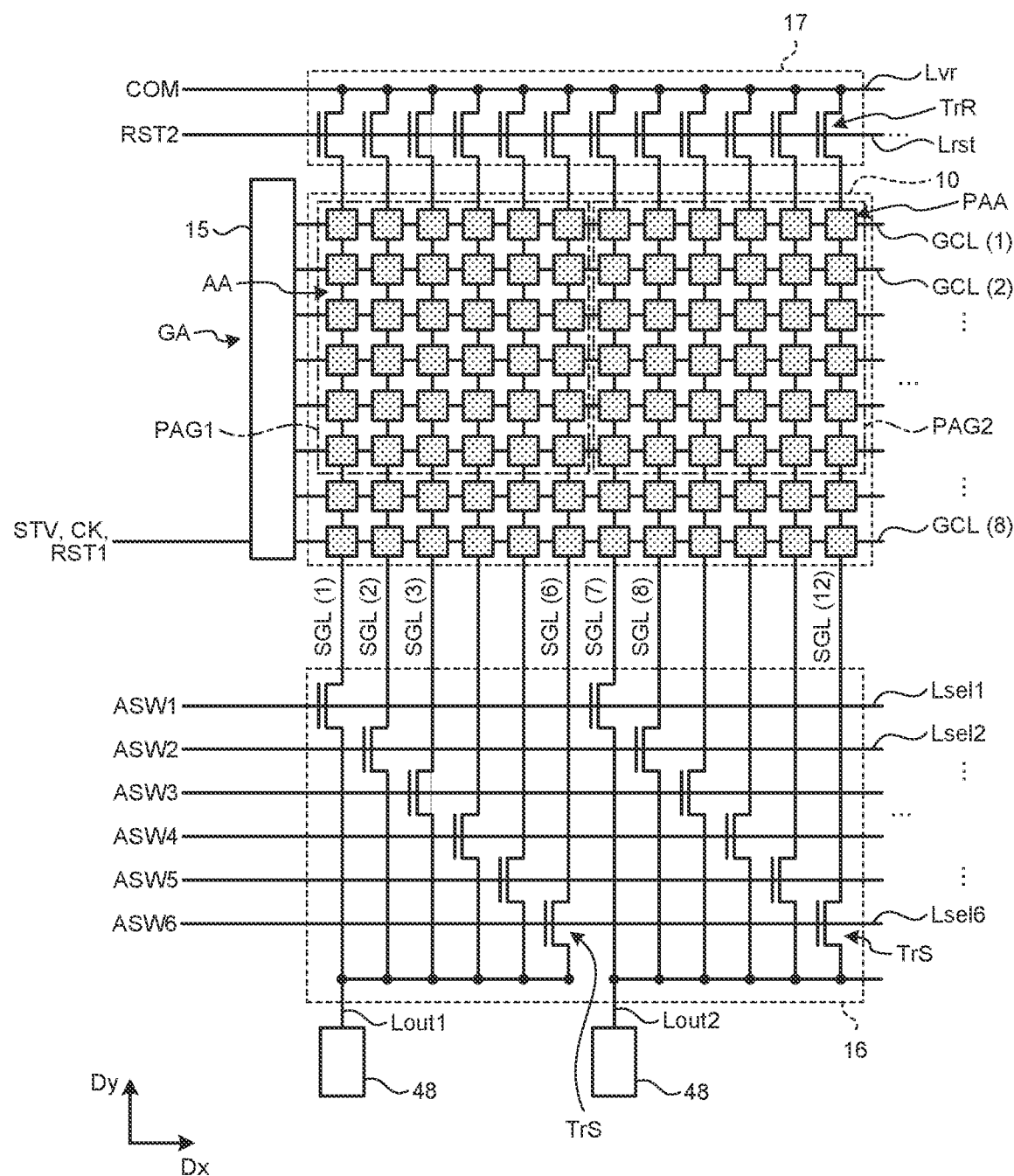
FIG. 4 is a circuit diagram illustrating the detection device.

The signal line selection circuit 16 is a switch circuit that sequentially or simultaneously selects a plurality of signal lines SGL (refer to FIG. 4). The signal line selection circuit 16 is, for example, a multiplexer. The signal line selection circuit 16 couples the selected signal lines SGL to the detection circuit 48 based on the selection signal ASW supplied from the detection controller 11. By this operation, the signal line selection circuit 16 outputs the detection signals Vdet of the photodiodes PD to the detector 40.

The detector 40 includes the detection circuit 48, a signal processor (signal processing circuit) 44, a coordinate extractor (coordinate extraction circuit) 45, a storage (storage circuit) 46, a detection timing controller (detection timing control circuit) 47, an image processor (image processing circuit) 49, and an output processor (output processing circuit) 50. Based on a control signal supplied from the detection controller 11, the detection timing controller 47 controls the detection circuit 48, the signal processor 44, the coordinate extractor 45, and the image processor 49 so as to operate in synchronization with one another.

The detection circuit 48 is, for example, an analog front-end (AFE) circuit. The detection circuit 48 is a signal processing circuit having functions of at least a detection signal amplifier 42 and an analog-to-digital (A/D) converter 43. The detection signal amplifier 42 amplifies the detection signals Vdet. The A/D converter 43 converts analog signals output from the detection signal amplifier 42 into digital signals.

The signal processor 44 is a logic circuit that detects a predetermined physical quantity received by the sensor 10 based on output signals of the detection circuit 48. When a finger is in contact with or in proximity to a detection surface, the signal processor 44 can detect the asperities on the surface of the finger or the palm based on the signals from the detection circuit 48. The signal processor 44 can also detect the information on the living body based on the signals from the detection circuit 48. Examples of the information on the living body include the vascular image, the pulse wave, the pulsation, and a blood oxygen level of the finger or the palm.

The signal processor 44 may also perform processing of acquiring the detection signals Vdet (information on the living body) simultaneously detected by the photodiodes PD, and averaging the detection signals Vdet. In this case, the detector 40 can perform stable detection by reducing measurement errors caused by relative positional misalignment between the object to be detected, such as a finger, and the sensor 10.

The storage 46 temporarily stores therein signals calculated by the signal processor 44. The storage 46 may be, for example, a random-access memory (RAM) or a register circuit.

The coordinate extractor 45 is a logic circuit that obtains detected coordinates of the asperities on the surface of a finger or the like when the contact or the proximity of the finger is detected by the signal processor 44. The coordinate extractor 45 is also a logic circuit that obtains detected coordinates of blood vessels of the finger or the palm. The image processor 49 combines the detection signals Vdet output from the respective photodiodes PD of the sensor 10 to generate two-dimensional information indicating the shape of the asperities on the surface of the finger or the like and two-dimensional information indicating the shape of the blood vessels of the finger or the palm. The coordinate extractor 45 may output the detection signals Vdet as sensor output voltages Vo instead of calculating the detected coordinates. A case can be considered where the detector 40 does not include the coordinate extractor 45 and the image processor 49.

The output processor 50 serves as a processor that performs processing based on the outputs from the photodiodes PD. The output processor 50 may include, for example, the detected coordinates obtained by the coordinate extractor 45 and the two-dimensional information generated by the image processor 49 in the sensor output voltages Vo. The function of the output processor 50 may be integrated into another component (the image processor 49, for example).

The following describes a circuit configuration example of the detection device 1. FIG. 4 is a circuit diagram illustrating the detection device. As illustrated in FIG. 4, the sensor 10 has the partial detection areas PAA arranged in a matrix. Each of the partial detection areas PAA is provided with the photodiode PD.

The gate lines GCL extend in the first direction Dx, and are coupled to the partial detection areas PAA arranged in the first direction Dx. A plurality of gate lines GCL(1), GCL(2), . . . , GCL(8) are arranged in the second direction Dy, and are each coupled to the gate line drive circuit 15. In the following description, the gate lines GCL(1), GCL(2), . . . , GCL(8) will each be simply referred to as the gate line GCL when they need not be distinguished from one another. For ease of understanding of the description, FIG. 4 illustrates eight gate lines GCL. However, this is merely an example, and M gate lines GCL (where M is eight or larger, and is, for example, 256) may be arranged.

The signal lines SGL extend in the second direction Dy and are coupled to the photodiodes PD of the partial detection areas PAA arranged in the second direction Dy. A plurality of signal lines SGL(1), SGL(2), . . . , SGL(12) are arranged in the first direction Dx and are each coupled to the signal line selection circuit 16 and a reset circuit 17. In the following description, the signal lines SGL(1), SGL(2), . . . , SGL(12) will each be simply referred to as the signal line SGL when they need not be distinguished from one another.

For ease of understanding of the description, 12 of the signal lines SGL are illustrated. However, this is merely an example, and N signal lines SGL (where N is 12 or larger, and is, for example, 252) may be arranged. The resolution of the sensor is, for example, 508 dots per inch (dpi), and the number of cells is 252×256. In FIG. 4, the sensor 10 is provided between the signal line selection circuit 16 and the reset circuit 17. The present disclosure is not limited thereto. The signal line selection circuit 16 and the reset circuit 17 may be coupled to ends of the signal lines SGL in the same direction.

The gate line drive circuit 15 receives the various control signals such as the start signal STV, the clock signal CK, and the reset signal RST1 from the control circuit 102 (refer to FIG. 2). The gate line drive circuit 15 sequentially selects the gate lines GCL(1), GCL(2), . . . , GCL(8) in a time-division manner based on the various control signals. The gate line drive circuit 15 supplies the gate drive signal Vgcl to the selected one of the gate lines GCL. This operation supplies the gate drive signal Vgcl to a plurality of first switching elements Tr coupled to the gate line GCL, and corresponding ones of the partial detection areas PAA arranged in the first direction Dx are selected as detection targets.

The signal line selection circuit 16 includes a plurality of selection signal lines Lsel, a plurality of output signal lines Lout, and third switching elements TrS. The third switching elements TrS are provided corresponding to the signal lines SGL. Six signal lines SGL(1), SGL(2), . . . , SGL(6) are coupled to a common output signal line Lout1. Six signal lines SGL(7), SGL(8), . . . , SGL(12) are coupled to a common output signal line Lout2. The output signal lines Lout1 and Lout2 are each coupled to the detection circuit 48.

The signal lines SGL(1), SGL(2), . . . , SGL(6) are grouped into a first signal line block, and the signal lines SGL(7), SGL(8), . . . , SGL(12) are grouped into a second signal line block. The selection signal lines Lsel are coupled to the gates of the respective third switching elements TrS included in one of the signal line blocks. One of the selection signal lines Lsel is coupled to the gates of the third switching elements TrS in the signal line blocks.

The control circuit 102 (refer to FIG. 2) sequentially supplies the selection signal ASW to the selection signal lines Lsel. This operation causes the signal line selection circuit 16 to operate the third switching elements TrS to sequentially select the signal lines SGL in one of the signal line blocks in a time-division manner. The signal line selection circuit 16 selects one of the signal lines SGL in each of the signal line blocks. With the above-described configuration, the detection device 1 can reduce the number of integrated circuits (ICs) including the detection circuit 48 or the number of terminals of the ICs. The signal line selection circuit 16 may couple more than one of the signal lines SGL collectively to the detection circuit 48.

As illustrated in FIG. 4, the reset circuit 17 includes a reference signal line Lvr, a reset signal line Lrst, and fourth switching elements TrR. The fourth switching elements TrR are provided corresponding to the signal lines SGL. The reference signal line Lvr is coupled to either the sources or the drains of the fourth switching elements TrR. The reset signal line Lrst is coupled to the gates of the fourth switching elements TrR.

The control circuit 102 supplies a reset signal RST2 to the reset signal line Lrst. This operation turns on the fourth switching elements TrR to electrically couple the signal lines SGL to the reference signal line Lvr. The power supply circuit 103 supplies a reference signal COM to the reference signal line Lvr. This operation supplies the reference signal COM to a capacitive element Ca (refer to FIG. 5) included in each of the partial detection areas PAA.

Figure 5:
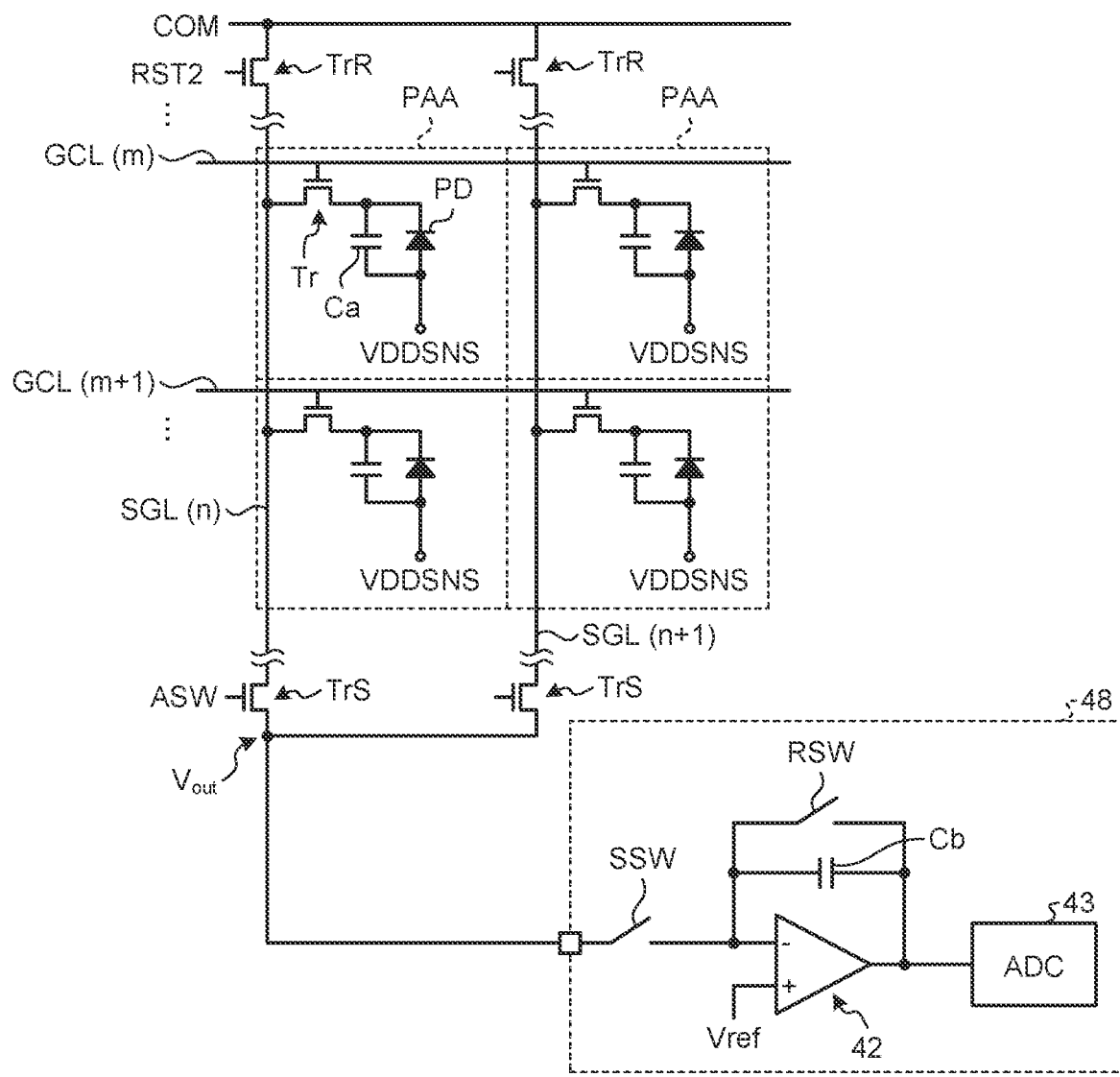
FIG. 5 is a circuit diagram illustrating a plurality of partial detection areas.

FIG. 5 is a circuit diagram illustrating the partial detection areas. FIG. 5 also illustrates a circuit configuration of the detection circuit 48. As illustrated in FIG. 5, each of the partial detection areas PAA includes the photodiode PD, the capacitive element Ca, and a corresponding one of the first switching elements Tr. The capacitive element Ca is capacitance (sensor capacitance) generated in the photodiode PD, and is equivalently coupled in parallel with the photodiode PD.

FIG. 5 illustrates two gate lines GCL(m) and GCL(m+1) arranged in the second direction Dy among the gate lines GCL. FIG. 5 also illustrates two signal lines SGL(n) and SGL(n+1) arranged in the first direction Dx among the signal lines SGL. The partial detection area PAA is an area surrounded by the gate lines GCL and the signal lines SGL.

The first switching elements Tr are provided corresponding to the photodiodes PD. Each of the first switching element Tr is fabricated from a thin-film transistor, and in this example, fabricated from an re-channel metal oxide semiconductor (MOS) thin-film transistor (TFT).

The gates of the first switching elements Tr belonging to the partial detection areas PAA arranged in the first direction Dx are coupled to the gate line GCL. The sources of the first switching elements Tr belonging to the partial detection areas PAA arranged in the second direction Dy are coupled to the signal line SGL. The drain of the first switching element Tr is coupled to the cathode of the photodiode PD and the capacitive element Ca.

The anode of the photodiode PD is supplied with the sensor power supply signal VDDSNS from the power supply circuit 103. The signal line SGL and the capacitive element Ca are supplied with the reference signal COM that serves as an initial potential of the signal line SGL and the capacitive element Ca from the power supply circuit 103.

When the partial detection area PAA is irradiated with light, a current corresponding to the amount of the light flows through the photodiode PD. As a result, an electric charge is stored in the capacitive element Ca. After the first switching element Tr is turned on, a current corresponding to the electric charge stored in the capacitive element Ca flows through the signal line SGL. The signal line SGL is coupled to the detection circuit 48 through a corresponding one of the third switching elements TrS of the signal line selection circuit 16. Thus, the detection device 1 can detect a signal corresponding to the amount of the light irradiating the photodiode PD in each of the partial detection areas PAA or each block unit.

During a reading period Pdet (refer to FIG. 6), a switch SSW of the detection circuit 48 is turned on, and the detection circuit 48 is coupled to the signal lines SGL. The detection signal amplifier 42 of the detection circuit 48 converts a current supplied from the signal lines SGL into a voltage corresponding to the value of the current, and amplifies the result. A reference potential (Vref) having a fixed potential is supplied to a non-inverting input terminal (+) of the detection signal amplifier 42, and the signal lines SGL are coupled to an inverting input terminal (−) of the detection signal amplifier 42. In the present embodiment, the same signal as the reference signal COM is supplied as the reference potential (Vref). The signal processor 44 (refer to FIG. 3) calculates the difference between the detection signal Vdet when light irradiates the photodiode PD and the detection signal Vdet when light does not irradiate the photodiode PD as each of the sensor output voltages Vo. The detection signal amplifier 42 includes a capacitive element Cb and a reset switch RSW. During a reset period Prst (refer to FIG. 6), the reset switch RSW is turned on, and an electric charge of the capacitive element Cb is reset.

Figure 6:
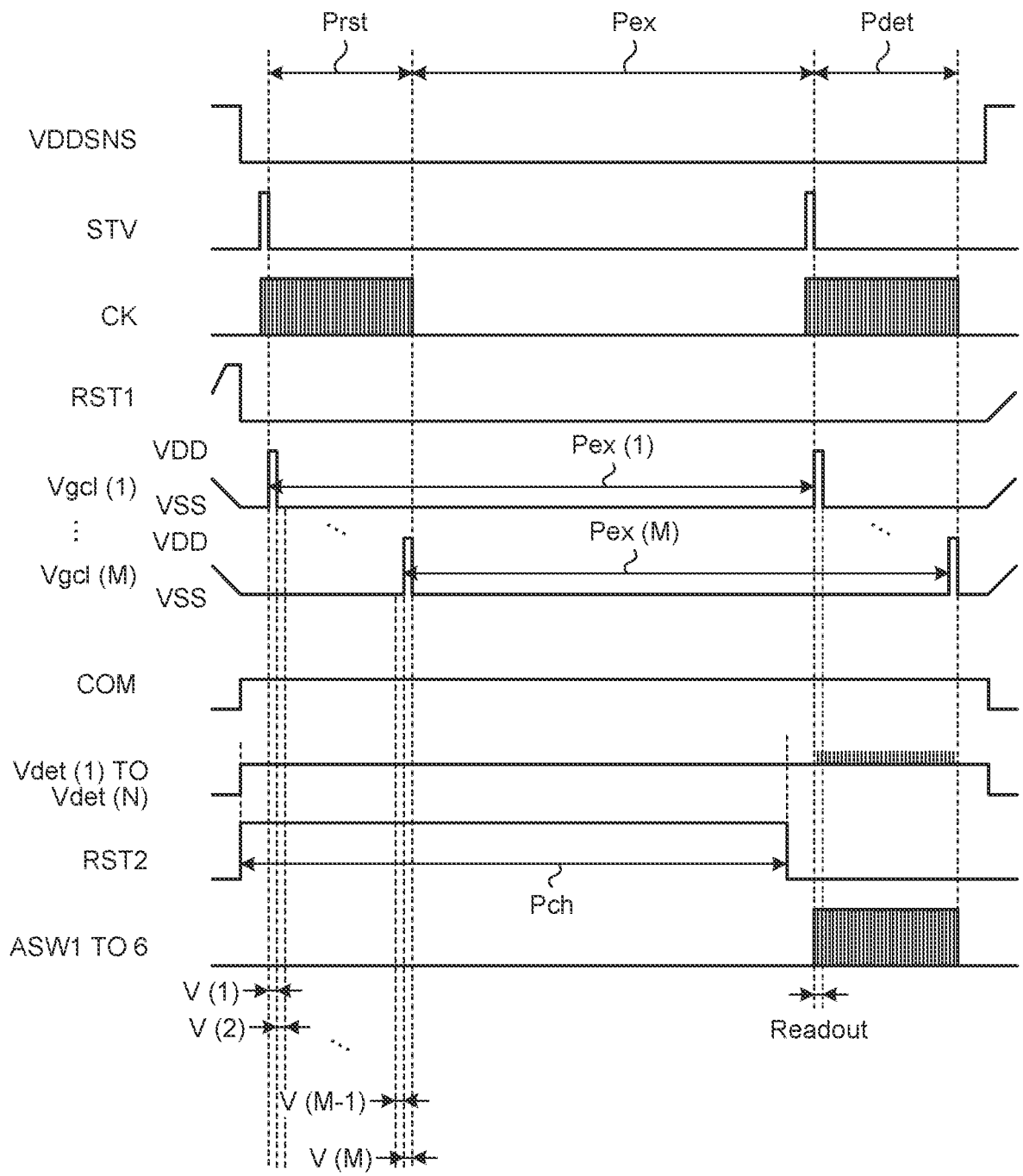
FIG. 6 is a timing waveform diagram illustrating an operation example of the detection device.

The following describes an operation example of the detection device 1. FIG. 6 is a timing waveform diagram illustrating the operation example of the detection device. As illustrated in FIG. 6, the detection device 1 has the reset period Prst, an exposure period Pex, and the reading period Pdet. The power supply circuit 103 supplies the sensor power supply signal VDDSNS to the anode of the photodiode PD over the reset period Prst, the exposure period Pex, and the reading period Pdet. The sensor power supply signal VDDSNS is a signal that applies a reverse bias between the anode and the cathode of the photodiode PD. For example, the reference signal COM at substantially 0.75 V is applied to the cathode of the photodiode PD, and the sensor power supply signal VDDSNS at substantially −1.25 V is applied to the anode of the photodiode PD. As a result, a reverse bias at substantially 2.0 V is applied between the anode and the cathode. The control circuit 102 sets the reset signal RST2 to "H", and then, supplies the start signal STV and the clock signal CK to the gate line drive circuit 15 to start the reset period Prst. During the reset period Prst, the control circuit 102 supplies the reference signal COM to the reset circuit 17, and uses the reset signal RST2 to turn on the fourth switching elements TrR for supplying a reset voltage. This operation supplies the reference signal COM as the reset voltage to each of the signal lines SGL. The reference signal COM is set to, for example, 0.75 V.

During the reset period Prst, the gate line drive circuit 15 sequentially selects each of the gate lines GCL based on the start signal STV, the clock signal CK, and the reset signal RST1. The gate line drive circuit 15 sequentially supplies the gate drive signals Vgcl {Vgcl(1), . . . , Vgcl(M)} to the gate lines GCL. The gate drive signal Vgcl has a pulsed waveform having a power supply voltage VDD serving as a high-level voltage and a power supply voltage VSS serving as a low-level voltage. In FIG. 6, M gate lines GCL (where M is, for example, 256) are provided, and the gate drive signals Vgcl(1), . . . , Vgcl(M) are sequentially supplied to the respective gate lines GCL. Thus, the first switching elements Tr are sequentially brought into a conducting state and supplied with the reset voltage on a row-by-row basis. For example, a voltage of 0.75 V of the reference signal COM is supplied as the reset voltage.

Thus, during the reset period Prst, the capacitive elements Ca of all the partial detection areas PAA are sequentially electrically coupled to the signal lines SGL, and are supplied with the reference signal COM. As a result, the capacitance of the capacitive elements Ca is reset. The capacitance of the capacitive elements Ca of some of the partial detection areas PAA can be reset by partially selecting the gate lines and the signal lines SGL.

Examples of the exposure timing control method include a control method of exposure during non-selection of gate lines and a full-time control method of exposure. In the control method of exposure during non-selection of gate lines, the gate drive signals {Vgcl(1), . . . , Vgcl(M)} are sequentially supplied to all the gate lines GCL coupled to the photodiodes PD serving as the detection targets, and all the photodiodes PD serving as the detection targets are supplied with the reset voltage. Then, after all the gate lines GCL coupled to the photodiode PD serving as the detection targets are set to a low voltage (the first switching elements Tr are turned off), the actual exposure starts and the actual exposure is performed during the exposure period Pex. After the actual exposure ends, the gate drive signals {Vgcl(1), . . . , Vgcl(M)} are sequentially supplied to the gate lines GCL coupled to the photodiodes PD serving as the detection targets as described above, and reading is performed during the reading period Pdet. In the full-time control method of exposure, control for performing the exposure can also be performed during the reset period Prst and the reading period Pdet (full-time exposure control). In this case, the exposure period Pex(1) starts after the gate drive signal Vgcl(1) is supplied to the gate line GCL during the reset period Prst. The term "exposure period Pex {(1), . . . , (M)}" refers to a period during which the capacitive elements Ca are charged from the photodiodes PD. The electric charge stored in the capacitive element Ca during the reset period Prst causes a reverse directional current (from cathode to anode) to flow through the photodiode PD due to light irradiation, and the potential difference in the capacitive element Ca decreases. The start timing and the end timing of the actual exposure periods Pex(1), . . . , Pex(M) are different among the partial detection areas PAA corresponding to the gate lines GCL. Each of the exposure periods Pex(1), . . . , Pex(M) starts when the gate drive signal Vgcl changes from the power supply voltage VDD serving as the high-level voltage to the power supply voltage VSS serving as the low-level voltage during the reset period Prst. Each of the exposure periods Pex(1), . . . , Pex(M) ends when the gate drive signal Vgcl changes from the power supply voltage VSS to the power supply voltage VDD during the reading period Pdet. The lengths of the exposure time of the exposure periods Pex(1), . . . , Pex(M) are equal.

In the control method of exposure during non-selection of gate lines, a current corresponding to the light irradiating the photodiode PD flows the photodiode PD in each of the partial detection areas PAA during the exposure period Pex {(1), . . . , (M)}. As a result, an electric charge is stored in each of the capacitive elements Ca.

At a time before the reading period Pdet starts, the control circuit 102 sets the reset signal RST2 to a low-level voltage. This operation stops operation of the reset circuit 17. The reset signal may be set to a high-level voltage only during the reset period Prst. During the reading period Pdet, the gate line drive circuit 15 sequentially supplies the gate drive signals Vgcl(1), . . . , Vgcl(M) to the gate lines GCL in the same manner as during the reset period Prst.

Specifically, the gate line drive circuit 15 supplies the gate drive signal Vgcl(1) at the high-level voltage (power supply voltage VDD) to the gate line GCL(1) during a period V(1). The control circuit 102 sequentially supplies selection signals ASW1, . . . , ASW6 to the signal line selection circuit 16 during a period in which the gate drive signal Vgcl(1) is at the high-level voltage (power supply voltage VDD). This operation sequentially or simultaneously couples the signal lines SGL of the partial detection areas PAA selected by the gate drive signal Vgcl(1) to the detection circuit 48. As a result, the detection signal Vdet for each of the partial detection areas PAA is supplied to the detection circuit 48.

In the same manner, the gate line drive circuit 15 supplies the gate drive signals Vgcl(2), . . . , Vgcl(M−1), Vgcl(M) at the high-level voltage to gate lines GCL(2), . . . , GCL(M−1), GCL(M) during periods V(2), . . . , V(M−1), V(M), respectively. That is, the gate line drive circuit 15 supplies the gate drive signal Vgcl to the gate line GCL during each of the periods V(1), V(2), . . . , V(M−1), V(M). The signal line selection circuit 16 sequentially selects each of the signal lines SGL based on the selection signal ASW in each period in which the gate drive signal Vgcl is set to the high-level voltage. The signal line selection circuit 16 sequentially couples each of the signal lines SGL to one detection circuit 48. Thus, the detection device 1 can output the detection signals Vdet of all the partial detection areas PAA to the detection circuit 48 during the reading period Pdet.

Figure 7:
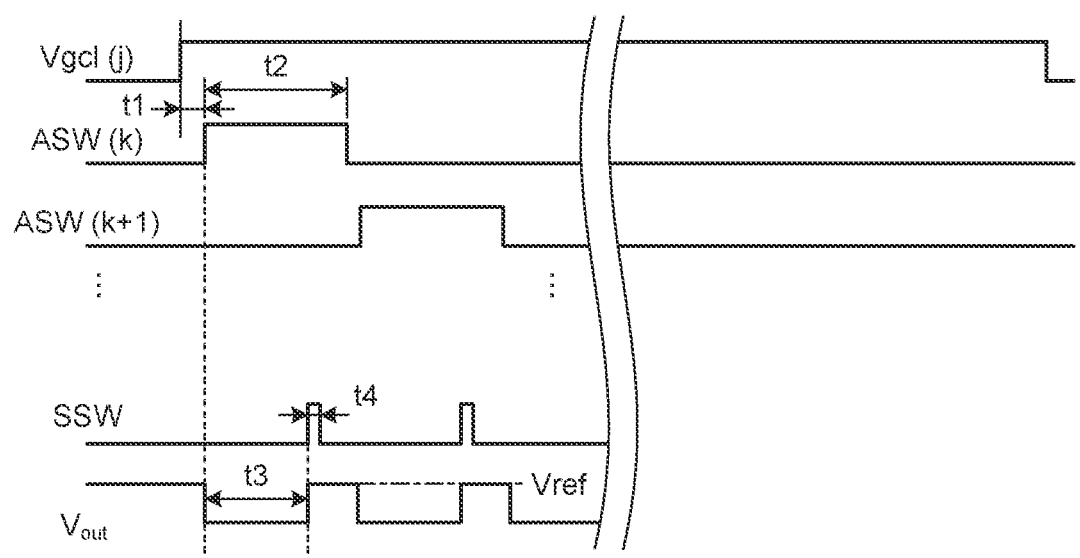
FIG. 7 is a timing waveform diagram illustrating an operation example during a reading period in FIG. 6.

FIG. 7 is a timing waveform diagram illustrating an operation example during the reading period in FIG. 6. With reference to FIG. 7, the following describes the operation example during a supply period Readout of one of the gate drive signals Vgcl(j) in FIG. 6. In FIG. 6, the reference sign of the supply period "Readout" is assigned to the first gate drive signal Vgcl(1), and the same applies to the other gate drive signals Vgcl(2), . . . , Vgcl(M). The index j is any one of the natural numbers 1 to M.

As illustrated in FIGS. 7 and 5, an output voltage ($V_{out}$) of each of the third switching elements TrS has been reset to the reference potential (Vref) voltage in advance. The reference potential (Vref) voltage serves as the reset voltage, and is set to, for example, 0.75 V. Then, the gate drive signal Vgcl(j) is set to a high level, and the first switching elements Tr of a corresponding row are turned on. Thus, each of the signal lines SGL in each row is set to a voltage corresponding to the electric charge stored in the capacitor (capacitive element Ca) of the partial detection area PAA. After a period t1 elapses from a rising edge of the gate drive signal Vgcl(j), a period t2 starts in which the selection signal ASW(k) is set to a high level. After the selection signal ASW(k) is set to the high level and the third switching element TrS is turned on, the electric charge stored in the capacitor (capacitive element Ca) of the partial detection area PAA coupled to the detection circuit 48 through the third switching element TrS changes the output voltage ($V_{out}$) of the third switching element TrS (refer to FIG. 5) to a voltage corresponding to the electric charge stored in the capacitor (capacitive element Ca) of the partial detection area PAA (period t3). In the example of FIG. 7, this voltage is reduced from the reset voltage as illustrated in the period t3. Then, after the switch SSW is turned on (period t4 during which an SSW signal is set to a high level), the electric charge stored in the capacitor (capacitive element Ca) of the partial detection area PAA moves to the capacitor (capacitive element Cb) of the detection signal amplifier 42 of the detection circuit 48, and the output voltage of the detection signal amplifier 42 is set to a voltage corresponding to the electric charge stored in the capacitive element Cb. At this time, the potential of the inverting input portion of the detection signal amplifier 42 is set to an imaginary short-circuit potential of an operational amplifier, and therefore, set to the reference potential (Vref). The A/D converter 43 reads the output voltage of the detection signal amplifier 42. In the example of FIG. 7, waveforms of the selection signals ASW(k), ASW(k+1), . . . corresponding to the signal lines SGL of the respective columns are set to a high level to sequentially turn on the third switching elements TrS, and the same operation is sequentially performed. This operation sequentially reads the electric charges stored in the capacitors (capacitive elements Ca) of the partial detection areas PAA coupled to the gate line GCL. ASW(k), ASW(k+1), . . . in FIG. 7 are, for example, any of ASW1 to ASW6 in FIG. 4.

Specifically, after the period t4 starts in which the switch SSW is on, the electric charge moves from the capacitor (capacitive element Ca) of the partial detection area PAA to the capacitor (capacitive element Cb) of the detection signal amplifier 42 of the detection circuit 48. At this time, the non-inverting input (+) of the detection signal amplifier 42 is set to the reference potential (Vref) voltage (for example, 0.75 V). As a result, the output voltage ($V_{out}$) of the third switching element TrS is also set to the reference potential (Vref) voltage due to the imaginary short-circuit between input ends of the detection signal amplifier 42. The voltage of the capacitive element Cb is set to a voltage corresponding to the electric charge stored in the capacitor (capacitive element Ca) of the partial detection area PAA at a location where the third switching element TrS is turned on in response to the selection signal ASW(k). After the output voltage ($V_{out}$) of the third switching element TrS is set to the reference potential (Vref) voltage due to the imaginary short-circuit, the output voltage of the detection signal amplifier 42 reaches a voltage corresponding to the capacitance of the capacitive element Cb, and this output voltage is read by the A/D converter 43. The voltage of the capacitive element Cb is, for example, a voltage between two electrodes provided on a capacitor constituting the capacitive element Cb.

The period t1 is, for example, 20 μs. The period t2 is, for example, 60 μs. The period t3 is, for example, 44.7 μs. The period t4 is, for example, 0.98 μs.

Although FIGS. 6 and 7 illustrate the example in which the gate line drive circuit 15 selects the gate line GCL individually, the present disclosure is not limited to this example. The gate line drive circuit 15 may simultaneously select a predetermined number (two or more) of the gate lines GCL and sequentially supply the gate drive signals Vgcl to the gate lines GCL in units of the predetermined number of the gate lines GCL. The signal line selection circuit 16 may also simultaneously couple a predetermined number (two or more) of the signal lines SGL to one detection circuit 48. Moreover, the gate line drive circuit 15 may skip some of the gate lines GCL and scan the remaining ones.

Figure 8:
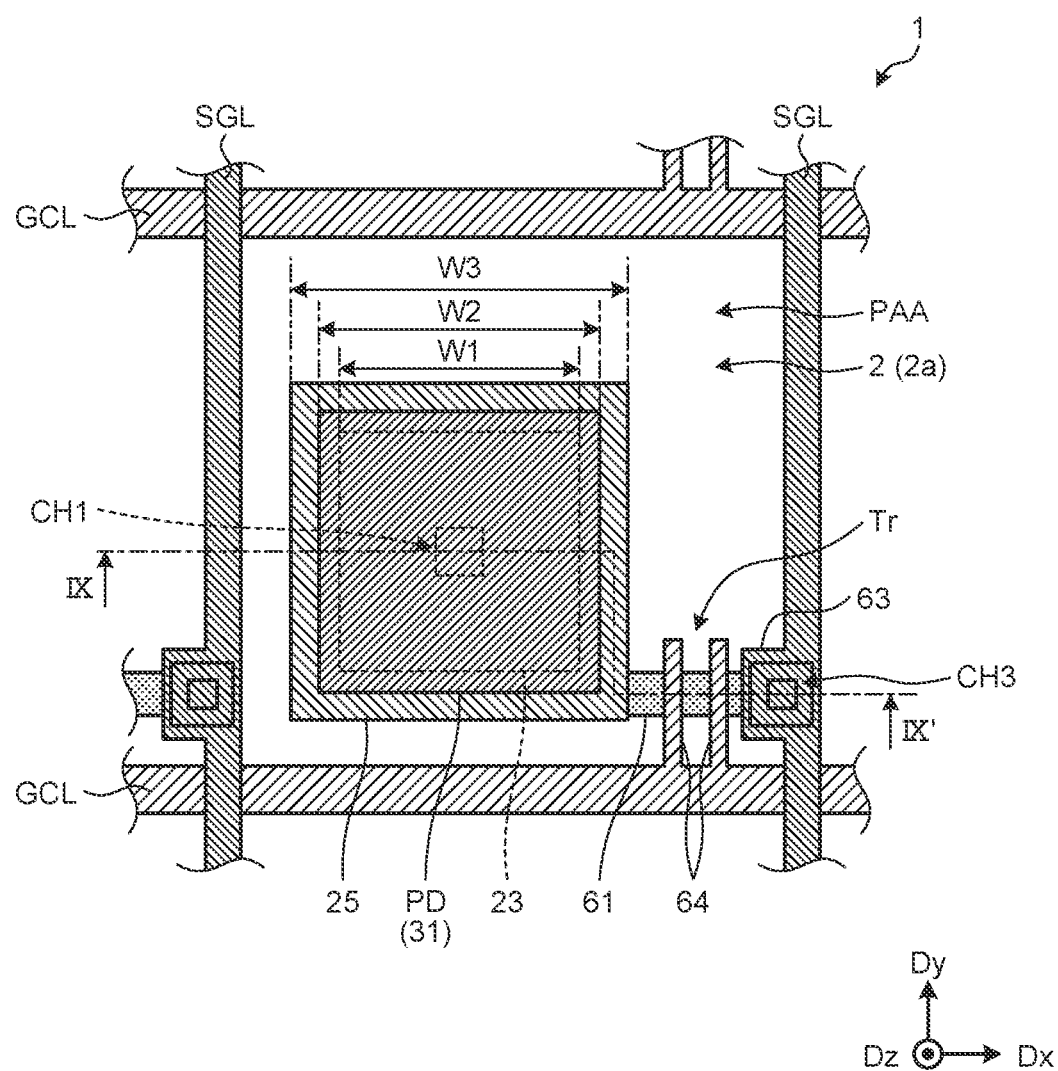
FIG. 8 is a magnified schematic configuration diagram of a sensor unit.

The following describes a configuration of the photodiode PD. FIG. 8 is a magnified schematic configuration diagram of the sensor. For ease of viewing, FIG. 8 illustrates an active layer 31 including an organic semiconductor material in a multilayered structure constituting the photodiode PD.

As illustrated in FIG. 8, the array substrate 2 includes various transistors such as the first switching element Tr formed on the sensor base member 21, the light-blocking layer 25, and various types of wiring such as the gate lines GCL and the signal lines SGL. In an area surrounded by the gate lines GCL and the signal lines SGL, the light-transmitting area 2a is an area that does not overlap the first switching element Tr and the light-blocking layer 25. Each of the light-blocking areas is an area overlapping the first switching element Tr and the light-blocking layer 25.

The first switching element Tr includes a semiconductor layer 61, a source electrode 62 (refer to FIG. 9), a drain electrode 63, and gate electrodes 64. The semiconductor layer 61 extends along the gate line GCL and intersects the gate electrodes 64 in the plan view. The gate electrodes 64 are coupled to the gate line GCL and extend in a direction orthogonal to the gate line GCL. One end side of the semiconductor layer 61 is coupled to the source electrode 62 through a second contact hole CH2 (refer to FIG. 9). The source electrode 62 is coupled to the light-blocking layer 25. The light-blocking layer 25 is electrically coupled to a first electrode 23 and the photodiode PD through a first contact hole CH1 formed in an organic insulating film 94 and a barrier film 26 (refer to FIG. 9). The other end side of the semiconductor layer 61 is coupled to the drain electrode 63 through a third contact hole CH3. The drain electrode 63 is coupled to the signal line SGL.

The configuration and the arrangement of the first switching element Tr illustrated in FIG. 8 are merely exemplary and can be changed as appropriate. For example, the first switching element Tr has what is called a double-gate structure in which the two gate electrodes 64 are provided so as to intersect the semiconductor layer 61. However, one gate electrode 64 may be provided so as to intersect the semiconductor layer 61.

As illustrated in FIG. 8, the first electrode 23 and photodiode PD are provided above the light-blocking layer 25. The first electrode 23, the photodiode PD, and the light-blocking layer 25 are provided in an island shape in the area surrounded by the gate lines GCL and the signal lines SGL. In the present embodiment, the light-transmitting area 2a is formed around the first electrode 23, the photodiode PD, and the light-blocking layer 25 except in an area coupled to the first switching element Tr. The first electrodes 23 are provided corresponding to the photodiodes PD in a matrix having a row-column configuration above the sensor base member 21. The first electrodes 23 are each a cathode electrode of the photodiode PD and may be called "detection electrode".

In the plan view, the area of the photodiode PD is smaller than the area of the light-blocking layer 25. The area of the first electrode 23 is smaller than the area of the active layer 31 that forms the photodiode PD. In addition, in the plan view, the photodiode PD (active layer 31) is disposed inside the outer perimeter of the light-blocking layer 25. The first electrode 23 is disposed inside the outer perimeter of the photodiode PD. A width W2 in the first direction Dx of the photodiode PD is less than a width W3 in the first direction Dx of the light-blocking layer 25. A width W1 in the first direction Dx of the first electrode 23 is less than the width W2 in the first direction Dx of the photodiode PD. The area ratio of light receiving portion of the photodiode PD to the light-transmitting area 2a is in a range from 0.8:1.0 to 1.0:0.8. The area ratio of the light receiving portion of the photodiode PD to the light-transmitting area 2a is more preferably approximately 1:1. In the present specification, the area of the "light receiving portions" of the photodiodes PD refers to an area of portions of the photodiodes PD (active layer 31) that is formed so as to overlap the first electrodes 23. When r denotes the area ratio of the light-transmitting area 2a to the area of one pixel, a light amount L that reaches the light receiving portions is proportional to the product (r×(1−r−a)) of a transmission amount (transmission area ratio (r)) and a received light amount (light-receiving area ratio (1−r−a)). The variable a denotes an area that neither transmits nor receives light. The light amount L reaching the light receiving portions becomes a maximum when r=(1−a)/2, and at this time, the light-receiving area is also 1−r−a=(1−a)/2. That is, the light amount L reaching the light receiving portions becomes a maximum when the ratio between the transmission area and the light-receiving area is 1:1. In consideration of design constraints and errors, the area ratio of the light receiving portions to the light-transmitting area 2a is preferably in a range from 0.8:1.0 to 1.0:0.8 as described above.

With this configuration, in the detection device 1, the light L2 reflected by the object to be detected such as the finger Fg irradiates the photodiodes PD through the light-transmitting area 2a. The detection device 1 can restrain the light L1a of the light from the backlight 121 that overlaps the light-blocking layers 25 from irradiating the photodiodes PD. As a result, the detection device 1 can improve the detection accuracy by restraining unnecessary light from irradiating the photodiodes PD even with the configuration provided with the backlight 121.

The light-blocking layer 25, the first electrode 23, and the photodiode PD illustrated in FIG. 8 have each a quadrilateral shape. The shape of the light-blocking layer 25, the first electrode 23, and the photodiode PD is not limited to this shape and may be another shape, such as a polygonal shape or a circular shape. The light-blocking layer 25, the first electrode 23, and the photodiode PD may have shapes different from one another. The areas, the shapes, and the arrangement pitch of the light-blocking layers 25, the first electrodes 23, and the photodiodes PD are merely exemplary and can be changed as appropriate depending on the characteristics and the detection accuracy required for the detection device 1.

Figure 9:
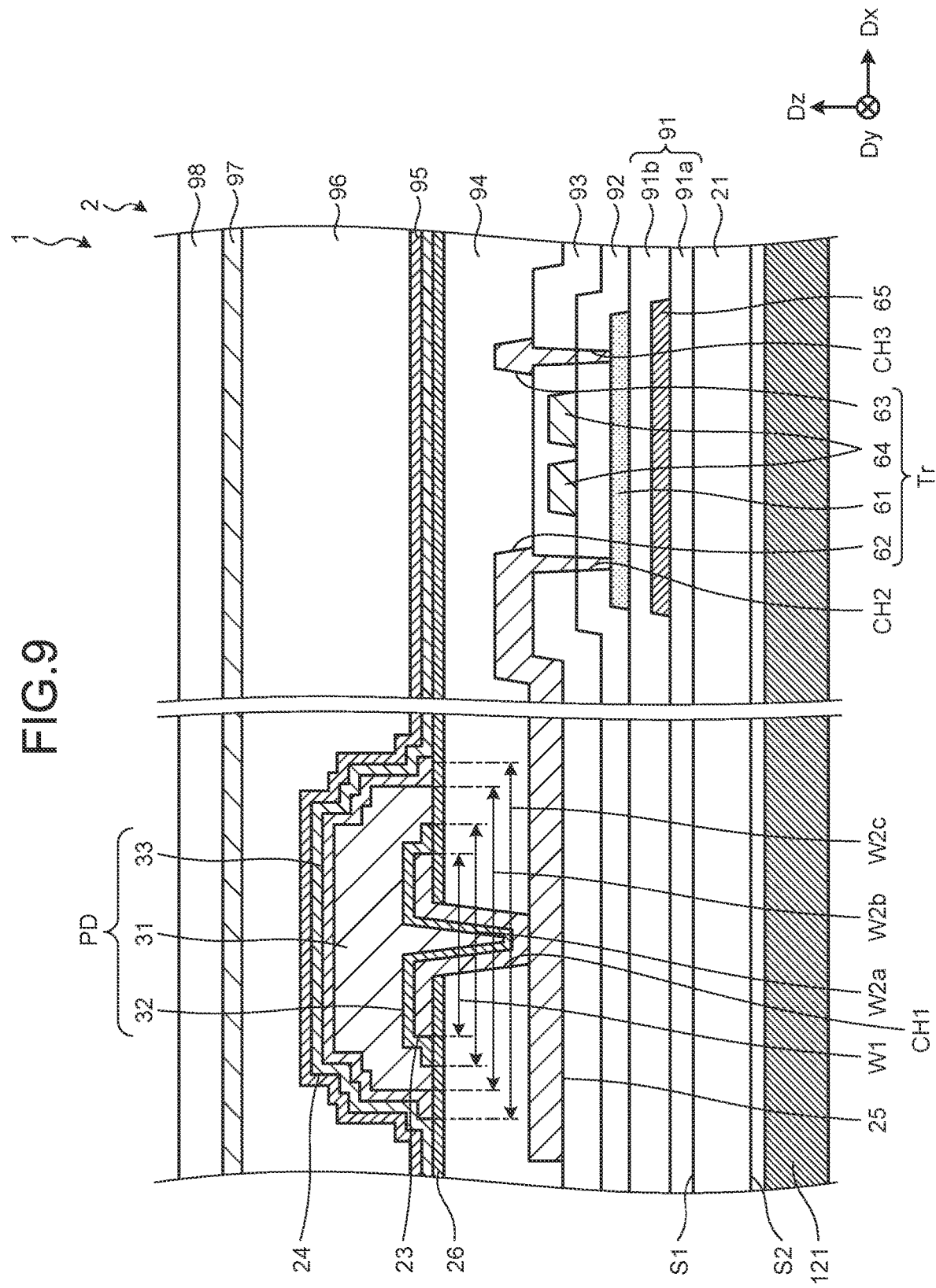
FIG. 9 is a IX-IX' sectional view of FIG. 8.

FIG. 9 is a IX-IX' sectional view of FIG. 8. As illustrated in FIG. 9, the detection device 1 further includes an insulating film 95, a sealing film 96, insulating films 97 and 98, and a second electrode 24 covering the photodiode PD. FIG. 9 does not illustrate the light guide portion 7 and the cover member 125 above the array substrate 2.

In the present specification, a direction from the sensor base member 21 toward the photodiode PD in a direction orthogonal to a surface of the sensor base member 21 is referred to as "upper side" or simply "above/on". A direction from the photodiode PD toward the sensor base member 21 is referred to as "lower side" or simply "below".

The sensor base member 21 is an insulating base member and is made using, for example, glass or a resin material. The sensor base member 21 is not limited to having a flat plate shape and may have a curved surface. In this case, the sensor base member 21 can be a film-like resin.

The sensor base member 21 is provided with TFTs, such as the first switching elements Tr, and various types of wiring, such as the gate lines GCL and the signal lines SGL. The array substrate 2 obtained by forming the TFTs, the various types of wiring, and the photodiodes PD on the sensor base member 21 is a drive circuit board for driving the sensor for each predetermined detection area and is also called a backplane or an active matrix substrate.

Undercoat films 91a and 91b are provided on the sensor base member 21. A transistor light-blocking film 65 is provided above the sensor base member 21 with the undercoat film 91a interposed therebetween. The transistor light-blocking film 65 is provided between the semiconductor layer 61 and the sensor base member 21. The transistor light-blocking film 65 can restrain light from entering a channel area of the semiconductor layer 61 from the sensor base member 21 side.

The undercoat film 91b is provided above the sensor base member 21 so as to cover the transistor light-blocking film 65. The undercoat films 91a and 91b are each formed of, for example, an inorganic insulating film such as a silicon nitride film or a silicon oxide film. An undercoat film 91 may be configured as a single-layer film in which the undercoat film 91a is not formed and only the undercoat film 91b is formed, or may be layered with a plurality of layers of three or more inorganic insulating films.

The first switching element Tr (transistor) is provided above the sensor base member 21. The semiconductor layer 61 is provided on the undercoat film 91b. For example, polysilicon is used as the semiconductor layer 61. The semiconductor layer 61 is, however, not limited thereto and may be formed of, for example, a microcrystalline oxide semiconductor, an amorphous oxide semiconductor, or low-temperature polysilicon.

A gate insulating film 92 is provided on the undercoat film 91 so as to cover the semiconductor layer 61. The gate insulating film 92 is, for example, an inorganic insulating film such as a silicon oxide film. The gate electrode 64 is provided on the gate insulating film 92. In the example illustrated in FIG. 9, the first switching element Tr has a top-gate structure. However, the first switching element Tr is not limited thereto and may have a bottom-gate structure, or a dual-gate structure in which the gate electrodes 64 are provided on both the upper side and the lower side of the semiconductor layer 61.

An interlayer insulating film 93 is provided on the gate insulating film 92 so as to cover the gate electrode 64. The interlayer insulating film 93 has, for example, a multilayered structure of a silicon nitride film and a silicon oxide film. The source electrode 62 and the drain electrode 63 are provided on the interlayer insulating film 93. The source electrode 62 is coupled to a source region of the semiconductor layer 61 through the second contact hole CH2 provided in the gate insulating film 92 and the interlayer insulating film 93. The drain electrode 63 is coupled to a drain region of the semiconductor layer 61 through the third contact hole CH3 provided in the gate insulating film 92 and the interlayer insulating film 93.

The light-blocking layer 25 is provided in the same layer as that of the source electrode 62 on the interlayer insulating film 93. In the present embodiment, the light-blocking layer 25 is formed continuously with, and of the same material as, the source electrode 62.

The organic insulating film 94 is provided on the interlayer insulating film 93 so as to cover the source electrode 62 and the drain electrode 63 of the first switching element Tr. The organic insulating film 94 is provided so as to further cover the light-blocking layer 25. The organic insulating film 94 is an organic planarizing film and has a better coverage property for steps formed by wiring and provides better surface flatness than inorganic insulating materials formed by, for example, chemical vapor deposition (CVD).

The barrier film 26 is provided on the organic insulating film 94. The barrier film 26 is an inorganic insulating film, for example. The first electrode 23, the photodiode PD, and the second electrode 24 are provided on the barrier film 26.

In more detail, the first electrodes 23 are arranged on the first principal surface S1 side of the sensor base member 21 and are provided on the barrier film 26 so as to overlap the light-blocking layers 25. The first electrode 23 is the cathode electrode of the photodiode PD and is formed of, for example, a light-transmitting conductive material such as indium tin oxide (ITO). Alternatively, since the detection device 1 is formed as a top-surface light receiving optical sensor including the backlight 121 as described above, the first electrode 23 can be made using, for example, a metal material such as silver (Ag). Alternatively, the first electrode 23 may be made of a metal material such as aluminum (Al) or an alloy material containing at least one or more of these metal materials. As described above, the first electrodes 23 are arranged so as to be separated for the respective partial detection areas PAA (photodiodes PD).

The photodiode PD is provided so as to cover the first electrode 23. In more detail, the photodiode PD includes the active layer 31, an electron transport layer 32 (first carrier transport layer) provided between the active layer 31 and the first electrode 23, and a hole transport layer 33 (second carrier transport layer) provided between the active layer 31 and the second electrode 24. The photodiode PD is formed in an area overlapping the light-blocking layer 25 by stacking the first electrode 23, the electron transport layer 32, the active layer 31, the hole transport layer 33, and the second electrode 24 in this order in the direction orthogonal to the sensor base member 21.

The active layer 31 changes in characteristics (for example, voltage-current characteristics and a resistance value) depending on light emitted thereto. An organic material is used as a material of the active layer 31. Specifically, the active layer 31 has a bulk heterostructure in which a p-type organic semiconductor is mixed with an n-type fullerene derivative ([6,6]-phenyl-$C_{61}$-butyric acid methyl ester (PCBM)) serving as an n-type organic semiconductor. As the active layer 31, low-molecular-weight organic materials can be used including, for example, fullerene ($C_{60}$), PCBM, copper phthalocyanine (CuPc), fluorinated copper phthalocyanine ($F_{16}$CuPc), rubrene (5,6,11,12-tetraphenyltetracene), and perylene diimide (PDI) (a derivative of perylene).

The active layer 31 can be formed by a vapor deposition process (dry process) using the above-listed low-molecular-weight organic materials. In this case, the active layer 31 may be, for example, a multilayered film of CuPc and $F_{16}$CuPc, or a multilayered film of rubrene and $C_{60}$. The active layer 31 can also be formed by a coating process (wet process). In this case, the active layer 31 is made using a material obtained by combining the above-listed low-molecular-weight organic materials with high-molecular-weight organic materials. As the high-molecular-weight organic materials, for example, poly(3-hexylthiophene) (P3HT) and F8-alt-benzothiadiazole (F8BT) can be used. The active layer 31 can be a film in the state of a mixture of P3HT and PCBM or a film in the state of a mixture of F8BT and PDI.

The electron transport layer 32 and the hole transport layer 33 are provided to facilitate electrons and holes generated in the active layer 31 to reach the first electrode 23 or the second electrode 24. The electron transport layer 32 is provided so as to cover the upper and side surfaces of the first electrode 23. Outer edges of the electron transport layer 32 contact the barrier film 26 in positions outside the first electrode 23. Ethoxylated polyethylenimine (PEIE) is used as a material of the electron transport layer 32.

The active layer 31 directly contacts the top of the electron transport layer 32. The active layer 31 is provided so as to cover the upper and side surfaces of the electron transport layer 32. Outer edges of the active layer 31 contact the barrier film 26 in positions outside the electron transport layer 32.

The hole transport layer 33 directly contacts the top of the active layer 31. The hole transport layer 33 is provided so as to cover the upper and side surfaces of the active layer 31. Outer edges of the hole transport layer 33 contact the barrier film 26 in positions outside the active layer 31. The hole transport layer 33 is a metal oxide layer. For example, tungsten oxide ($WO_3$) or molybdenum oxide is used as the oxide metal layer.

That is, a width W2$a$ in the first direction Dx of the electron transport layer 32 is greater than the width W1 in the first direction Dx of the first electrode 23. A width W2$b$ in the first direction Dx of the active layer 31 is greater than the width W2$a$ in the first direction Dx of the electron transport layer 32. A width W2$c$ in the first direction Dx of the hole transport layer 33 is greater than the width W2$b$ in the first direction Dx of the active layer 31.

The side surfaces of the first electrode 23, the electron transport layer 32, and the active layer 31 are covered by the hole transport layer 33 located in the uppermost layer of the photodiode PD. In more detail, the outer edges of the first electrode 23, the electron transport layer 32, the active layer 31, and the hole transport layer 33 contact the same plane on the upper surface of the barrier film 26. The sides of the first electrode 23, the sides of the electron transport layer 32, the sides of the active layer 31, and the sides of the hole transport layer 33 are arranged in this order along the upper surface of the barrier film 26. The electron transport layer 32 and the hole transport layer 33 are arranged so as to be separated with the active layer 31 interposed therebetween.

The second electrode 24 is provided on the photodiode PD. In more detail, the second electrode 24 is provided above the barrier film 26 so as to cover the upper and side surfaces of the hole transport layer 33. The second electrode 24 is an anode electrode of the photodiode PD. Although FIGS. 8 and 9 illustrate one of the partial detection areas PAA (photodiodes PD), the second electrode 24 is continuously provided across the partial detection areas PAA (photodiodes PD). The second electrode 24 is formed of, for example, a light-transmitting conductive material such as ITO or indium zinc oxide (IZO).

With the above-described configuration, the electron transport layer 32, the active layer 31, and the hole transport layer 33 forming the photodiode PD are provided in an island shape in the individual area surrounded by the gate lines GCL and the signal lines SGL. Each layer of the photodiode PD is provided so as to cover the upper and side surfaces of a layer therebelow, and the second electrode 24 is provided so as to contact the hole transport layer 33 and so as not to contact the first electrode 23, the electron transport layer 32, and active layer 31 that are located in layers lower than the hole transport layer 33. Therefore, in the present embodiment, short circuits between the anode and the cathode of the photodiode PD can be reduced even when the photodiode PD is formed individually for each of the partial detection areas PAA. More specifically, the side surfaces of the respective layers can be restrained from being electrically coupled to one another through the second electrode 24 covering the photodiode PD as compared with a configuration in which the electron transport layer 32, the active layer 31, and the hole transport layer 33 included in the photodiode PD are stacked to have the same width, and the side surfaces of each of the layers are exposed.

The insulating film 95 is provided so as to cover the second electrode 24. The insulating film 95 is an inorganic insulating film and is continuously provided across the partial detection areas PAA (photodiodes PD) so as to cover the entire second electrode 24.

The sealing film 96 is provided on the second electrode 24. An inorganic film such as a silicon nitride film or an aluminum oxide film or a resin film such as an acrylic film is used as the sealing film 96. The sealing film 96 is not limited to a single layer and may be a multilayered film of two or more layers obtained by combining the inorganic film with the resin film described above. The sealing film 96 well seals the photodiode PD and thus can restrain water from entering the photodiode PD from the upper surface side.

The insulating films 97 and 98 are provided so as to cover the sealing film 96. The insulating film 97 is an inorganic insulating film, for example. The insulating film 98 is an organic insulating film (resin layer), for example.

The materials and manufacturing methods of the electron transport layer 32, the active layer 31, and the hole transport layer 33 are merely exemplary, and other materials and manufacturing methods may be used. The widths W1, W2, W2$a$, W2$b$, and W2$c$ and thicknesses of the layers of the photodiode PD illustrated in FIG. 9 are only schematically illustrated and can be changed as appropriate. The insulating films 97 and 98 only need to be provided as required and can be omitted.

As described above, the detection device 1 of the present embodiment includes the sensor base member 21 (substrate), the first electrodes 23 arranged on the first principal surface S1 of the sensor base member 21, the photodiodes PD that are provided corresponding to the first electrodes 23 and each include the electron transport layer 32 (first carrier transport layer), the active layer 31, and the hole transport layer 33 (second carrier transport layer), the second electrode 24 provided across the photodiodes PD, the backlight 121 provided on the second principal surface S2 side opposite to the first principal surface S1 of the sensor base member 21, the light-blocking layers 25 provided between the backlight 121 and the photodiodes PD, and the light-transmitting area 2a formed between the adjacent light-blocking layers 25.

With this configuration, in the light-transmitting area 2a, the light L1 of the light emitted from the backlight 121 is emitted through the light-transmitting area 2a of the array substrate 2 toward the object to be detected, such as the finger Fg. The light L2 reflected by the object to be detected, such as the finger Fg, is received by the photodiodes PD through the light guide portion 7. In contrast, in the light-blocking areas, the light L1a of the light emitted from the backlight 121 is blocked by the light-blocking layers 25 and is not emitted toward the photodiodes PD and the object to be detected, such as the finger Fg, above the light-blocking layers 25. The photodiodes PD of the detection device 1 are mainly irradiated by the light L2 reflected by the object to be detected such as the finger Fg, and light other than the light L2 from the object to be detected such as the finger Fg (for example, the light L1a directly emitted from the backlight 121) can be restrained from irradiating the photodiodes PD. Thus, the detection device 1 having the backlight 121 can improve the detection accuracy.

Second Embodiment

Figure 10:
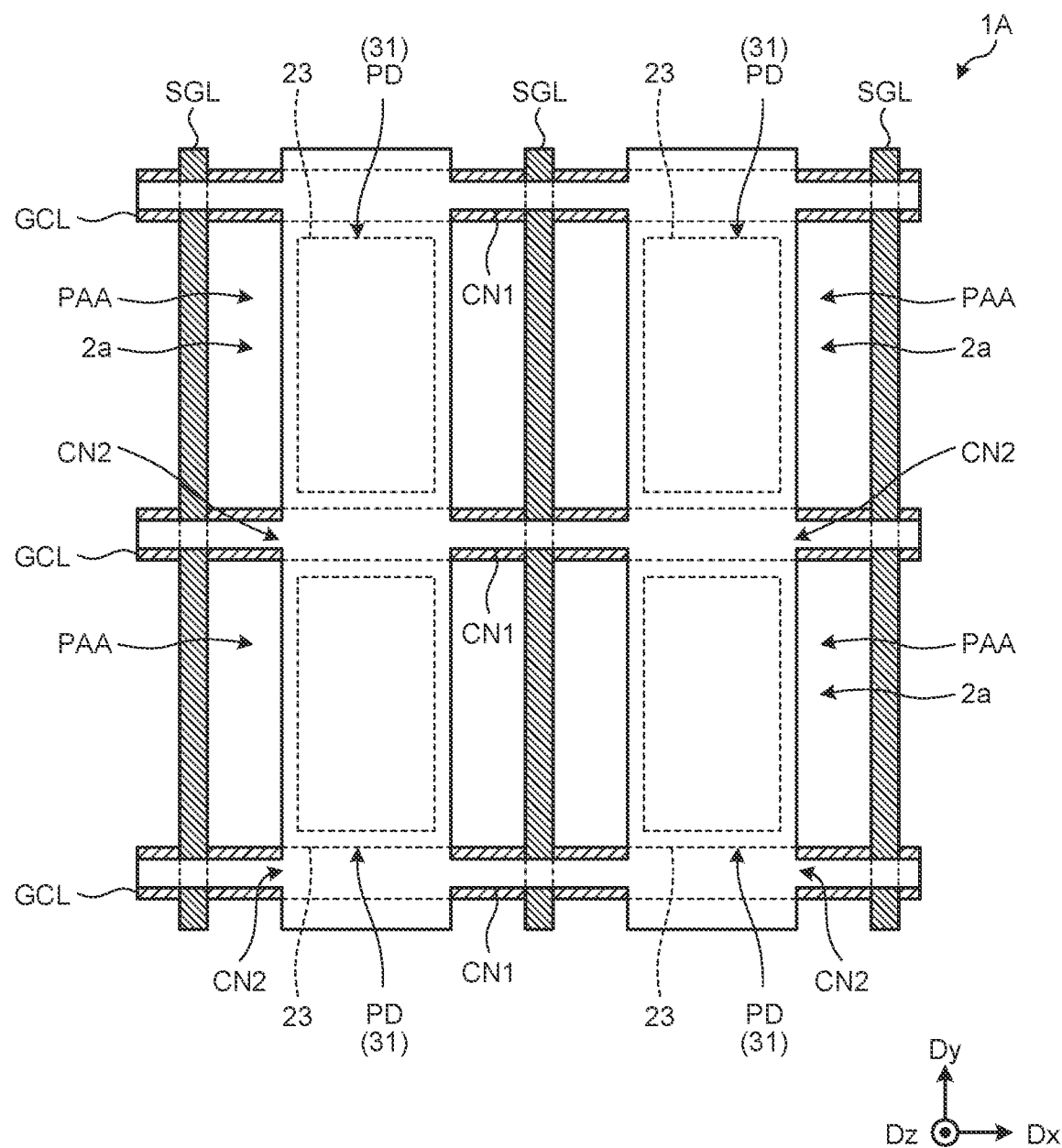
FIG. 10 is a magnified schematic configuration diagram of the sensor of a detection device according to a second embodiment.
Figure 11:
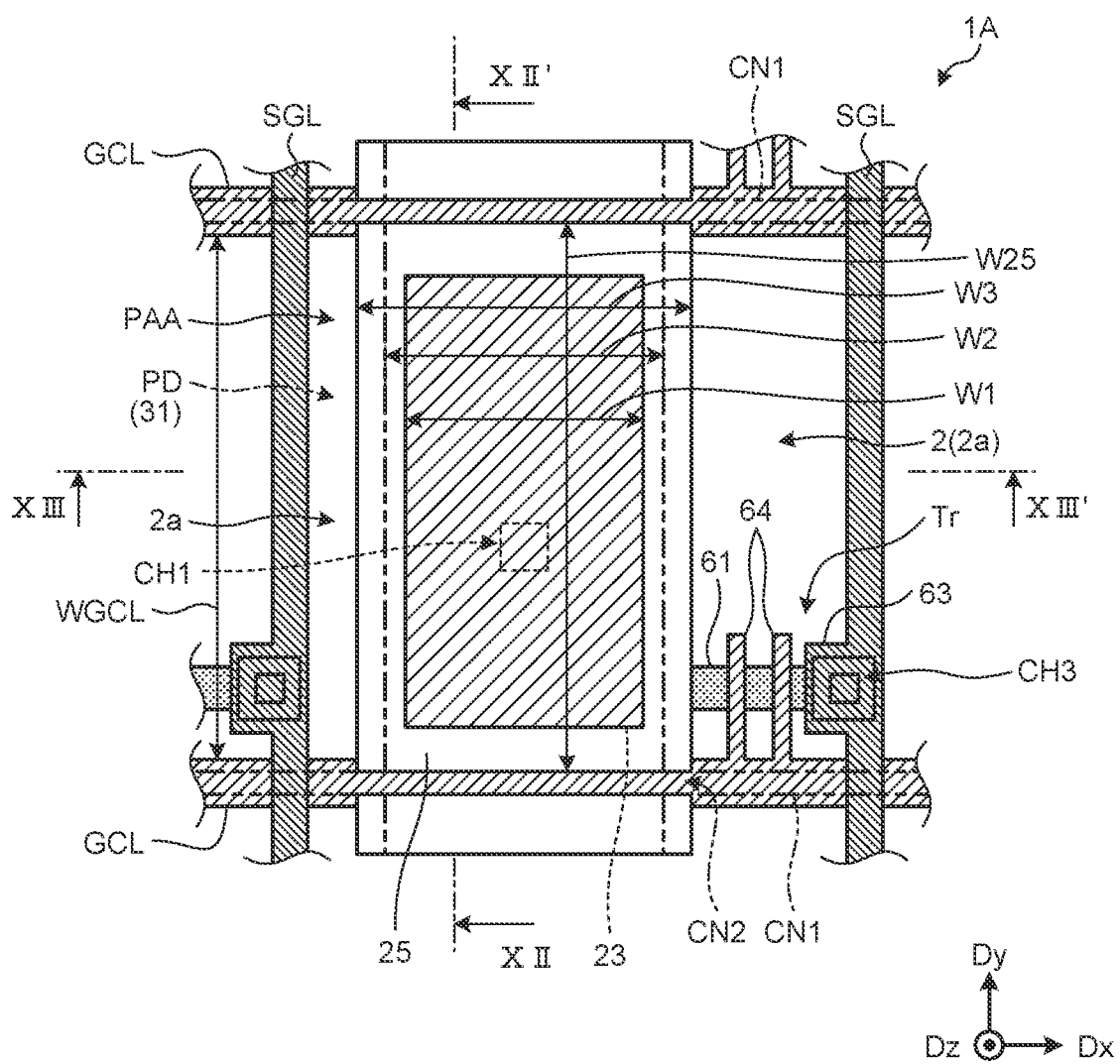
FIG. 11 is a magnified schematic configuration diagram illustrating a portion of the sensor of the detection device according to the second embodiment.

FIG. 10 is a magnified schematic configuration diagram of the sensor of a detection device according to a second embodiment. FIG. 11 is a magnified schematic configuration diagram illustrating a portion of the sensor of the detection device according to the second embodiment. FIG. 10 illustrates a plan view of the adjacent partial detection areas PAA (photodiodes PD), and FIG. 11 illustrates a magnified view of one of the partial detection areas PAA (photodiodes PD). For ease of viewing, FIG. 11 illustrates the photodiode PD with long dashed double-short dashed lines. In the following description, the same components as those described in the above-described embodiment are denoted by the same reference numerals, and the repetitive explanation thereof will be omitted.

As illustrated in FIGS. 10 and 11, the following describes a configuration of a detection device 1A according to the second embodiment in which, unlike in the first embodiment described above, the electron transport layer 32, the active layer 31, and the hole transport layer 33 that form the photodiode PD are continuously formed across the adjacent partial detection areas PAA.

The first electrodes 23 are formed individually for respective areas surrounded by the signal lines SGL and the gate lines GCL. The photodiode PD is formed for each of the first electrodes 23. The photodiodes PD adjacent to each other in the second direction Dy are coupled together through a second coupling portion CN2 overlapping the gate line GCL. The photodiodes PD and the second coupling portion CN2 that are adjacent to each other in the first direction Dx are coupled together through a first coupling portion CN1 that extends in the first direction Dx so as to overlap the gate line GCL In more detail, the electron transport layer 32, the active layer 31, and the hole transport layer 33 (FIGS. 10 and 11 illustrate the active layer 31) that form the photodiode PD are formed so as to overlap each of the first electrodes 23. The first and the second coupling portions CN1 and CN2 have each the same multilayered structure as that of the electron transport layer 32, the active layer 31, and the hole transport layer 33 that form the photodiode PD.

The electron transport layer 32, the active layer 31, and the hole transport layer 33 that form the photodiodes PD and the second coupling portions CN2 have the same width and are continuously formed so as to overlap the first electrodes 23 and the gate lines GCL that are arranged in the second direction Dy. The electron transport layer 32, the active layer 31, and the hole transport layer 33 that form the first and the second coupling portions CN1 and CN2 extend in the first direction Dx so as to overlap the gate lines GCL. That is, the electron transport layer 32, the active layer 31, and the hole transport layer 33 that form the photodiodes PD and the first and the second coupling portions CN1 and CN2 are formed in a grid pattern.

As illustrated in FIG. 11, sides on one end side and the other end side in the second direction Dy of the light-blocking layer 25 are arranged so as to each overlap part of the gate line GCL. The light-blocking layers 25 adjacent to each other in the second direction Dy are separately arranged with a gap therebetween on the gate line GCL. A width W25 in the second direction Dy of the light-blocking layer 25 is slightly greater than a gap WGCL between two of the gate lines GCL adjacent in the second direction Dy.

This configuration allows the light-blocking layer 25 to block the light L1a coming from the backlight 121. In the present embodiment, the gate line GCL serves as a light-blocking layer for the first and the second coupling portions CN1 and CN2 that couple the photodiodes PD together. The width of the first coupling portion CN1 is less than the width of the gate line GCL. The second coupling portion CN2 overlaps the gate line GCL and the one end side and the other end side in the second direction Dy of the light-blocking layer 25. This configuration restrains the light L1a coming from the backlight 121 from irradiating the first and the second coupling portions CN1 and CN2, and thereby can reduce generation of unwanted photocarriers in the first and the second coupling portions CN1 and CN2. In the present embodiment, the light-transmitting area 2a is formed in an area surrounded by the light-blocking layer 25 and the signal line SGL adjacent in the first direction Dx and two of the gate lines GCL adjacent in the second direction Dy.

Figure 12:
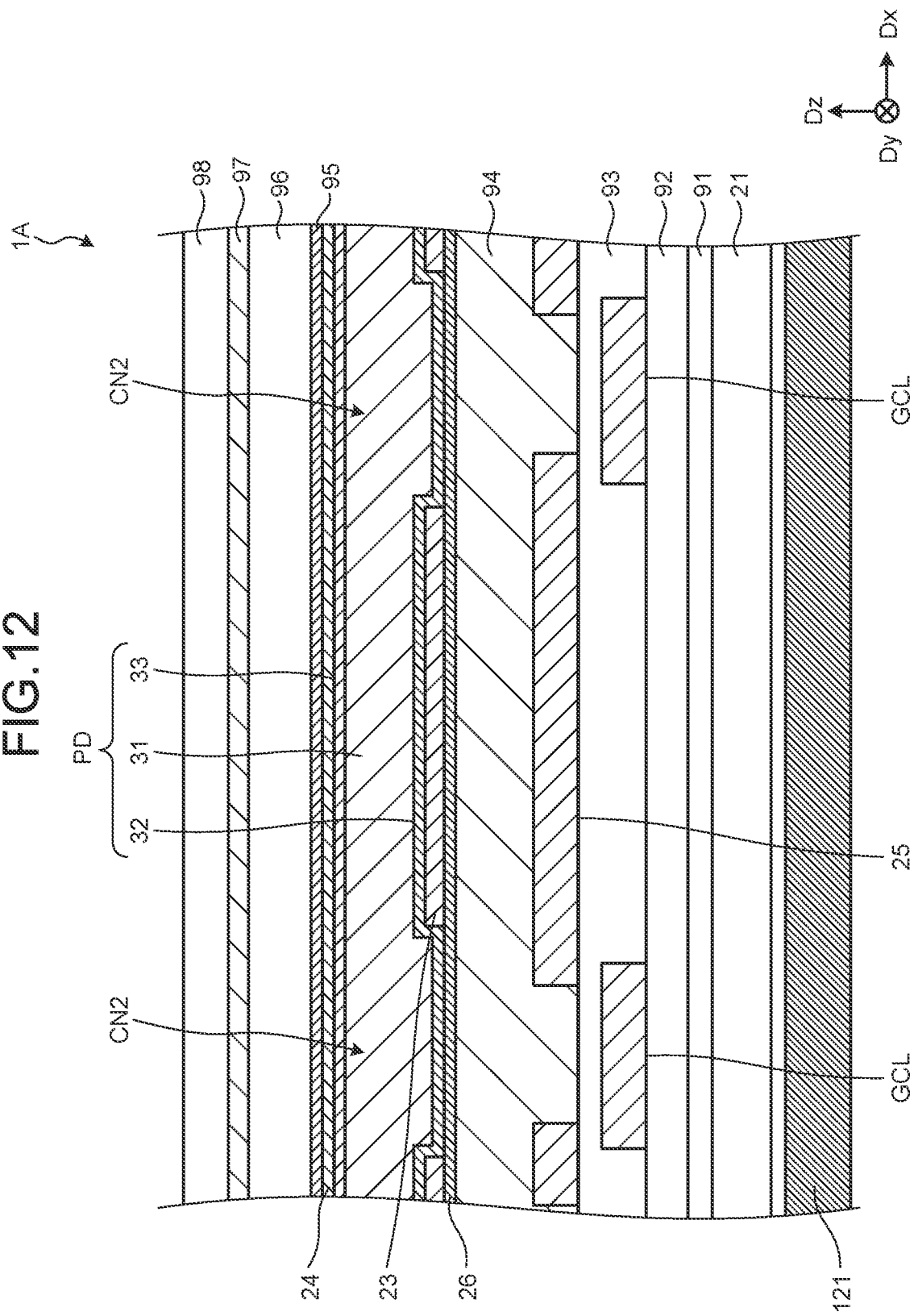
FIG. 12 is a XII-XII' sectional view of FIG. 11.

FIG. 12 is a XII-XII' sectional view of FIG. 11. As illustrated in FIG. 12, the electron transport layer 32, the active layer 31, and the hole transport layer 33 are continuously formed over the first electrodes 23 arranged in the second direction Dy. The electron transport layer 32 is provided so as to cover the upper surfaces and side surfaces in the second direction Dy of the first electrodes 23. The electron transport layer 32 is provided so as also to cover the barrier film 26 between the adjacent first electrodes 23. In more detail, in an area overlapping the photodiode PD, the first electrode 23, the electron transport layer 32, the active layer 31, the hole transport layer 33, and the second electrode 24 are stacked in this order on the barrier film 26. In an area overlapping the second coupling portion CN2, the electron transport layer 32, the active layer 31, the hole transport layer 33, and the second electrode 24 are stacked in this order on the barrier film 26. The second electrode 24 is provided so as to cover the photodiodes PD and the second coupling portions CN2.

Figure 13:
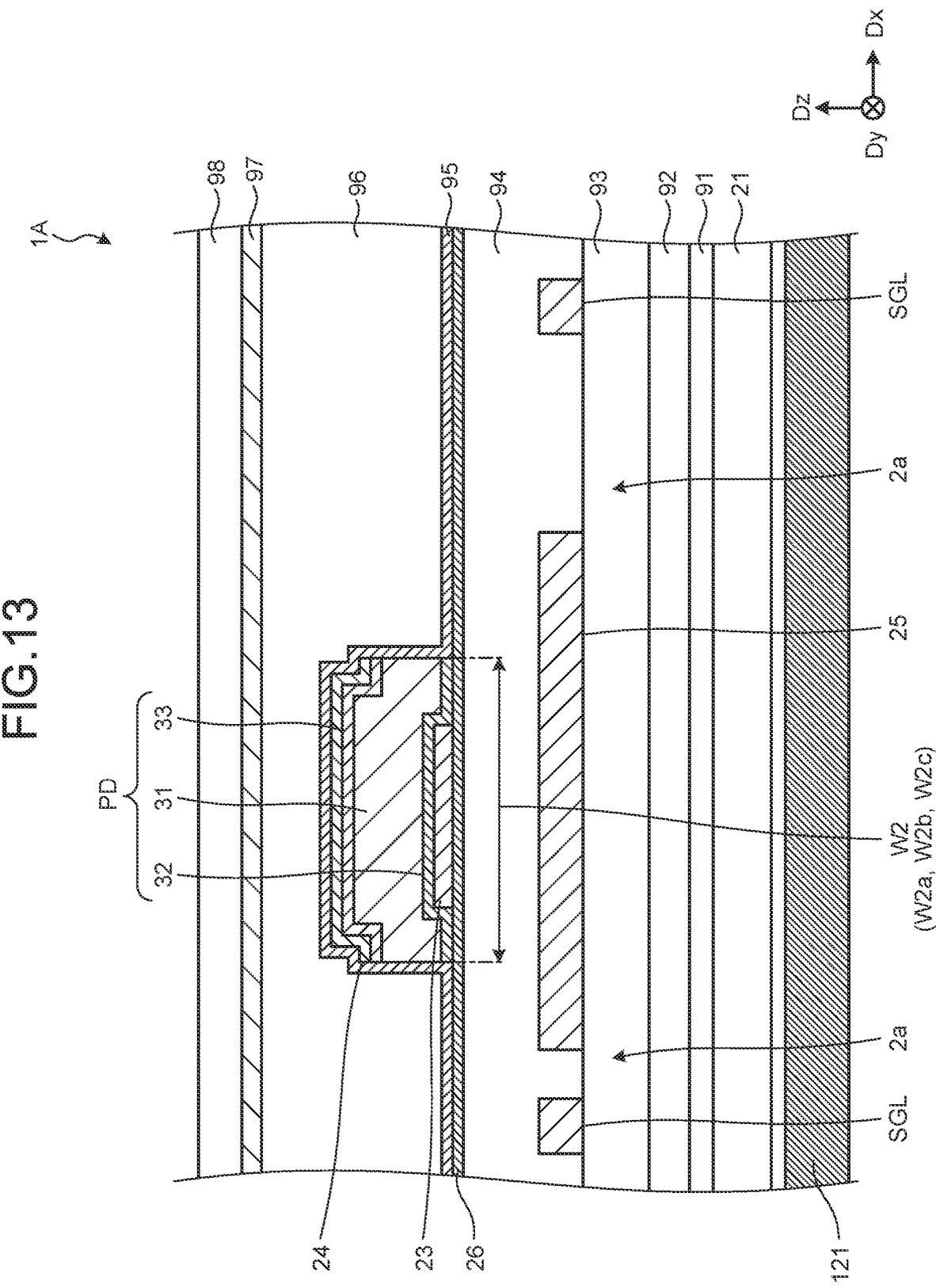
FIG. 13 is a XIII-XIII' sectional view of FIG. 11.

FIG. 13 is a XIII-XIII' sectional view of FIG. 11. As illustrated in FIG. 13, the electron transport layer 32 is provided so as to cover the upper surface and side surfaces in the first direction Dx of the first electrode 23. The outer edges of the electron transport layer 32 contact the barrier film 26 in positions outside the first electrode 23. In the detection device 1A of the second embodiment, the electron transport layer 32 (first carrier transport layer), the active layer 31, the hole transport layer 33 (second carrier transport layer), and the second electrode 24 are stacked to have the same width W2. In other words, the side surfaces of each of the electron transport layer 32, the active layer 31, the hole transport layer 33, and the second electrode 24 are provided so as to overlap in the same position. The insulating film 95 covers the upper surface of the second electrode 24 and the side surfaces of the layers of the electron transport layer 32, the active layer 31, the hole transport layer 33, and the second electrode 24.

Also in the second embodiment, this configuration can reduce the short circuits between the anode and the cathode of the photodiode PD.

In the present embodiment, the photodiodes PD and the first and the second coupling portions CN1 and CN2 can be formed in the same process by collectively patterning the electron transport layer 32, the active layer 31, and the hole transport layer 33 using the second electrode 24 as a mask. That is, in the second embodiment, the manufacturing process of the photodiodes PD can be more simplified than in the first embodiment.

Third Embodiment

Figure 14:
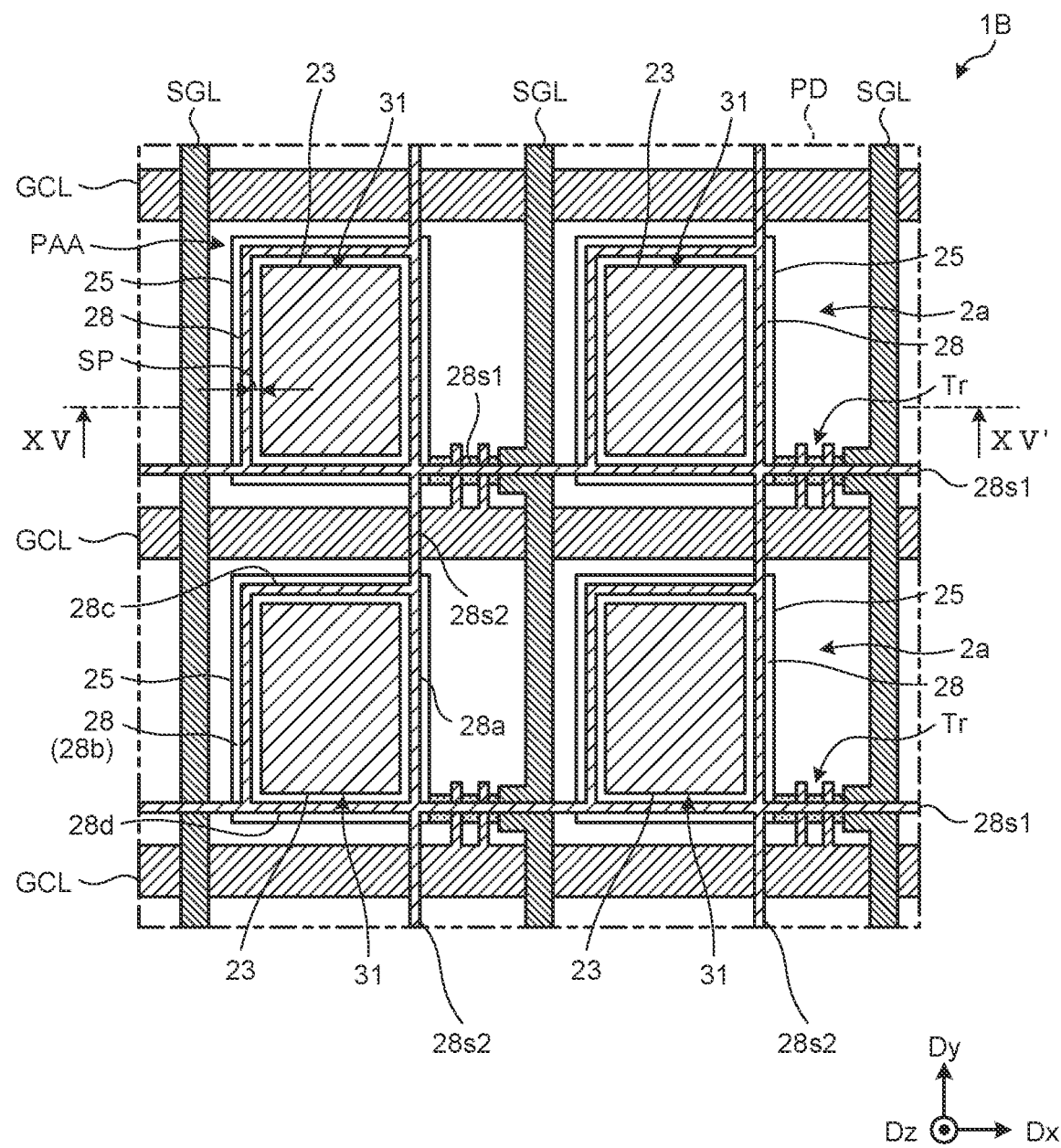
FIG. 14 is a magnified schematic configuration diagram of the sensor of a detection device according to a third embodiment.

FIG. 14 is a magnified schematic configuration diagram of the sensor of a detection device according to a third embodiment. FIG. 14 does not illustrate the electron transport layer 32, the active layer 31, and the hole transport layer 33 that form the photodiodes PD. In the present embodiment, unlike in the first and the second embodiments described above, the electron transport layer 32, the active layer 31, and the hole transport layer 33 are continuously formed over the partial detection areas PAA (photodiodes PD). In other words, the electron transport layer 32, the active layer 31, and the hole transport layer 33 are provided so as to overlap the light-blocking areas that overlap, for example, the light-blocking layers 25, the signal lines SGL, and the gate lines GCL, and so as to overlap the light-transmitting area 2a that does not overlap, for example, the light-blocking layers 25, the signal lines SGL, and the gate lines GCL.

As illustrated in FIG. 14, a detection device 1B according to the third embodiment further includes shield wiring 28. The shield wiring 28 is provided so as to surround the first electrode 23 and is supplied with a fixed potential. The fixed potential is, for example, the same voltage signal as the reference signal COM (refer to FIG. 5). The shield wiring 28 and the first electrode 23 are provided so as to overlap the light-blocking layer 25. In the plan view, the shield wiring 28 and the first electrode 23 are disposed inside the outer perimeter of the light-blocking layer 25.

In more detail, the shield wiring 28 has linear portions 28a and 28b that extend in the second direction Dy and linear portions 28c and 28d that extend in the first direction Dx. The linear portions 28a, 28b, 28c, and 28d are coupled to form the shield wiring 28 into a ring shape. The first electrode 23 is disposed between the linear portions 28a and 28b in the first direction Dx, and the first electrode 23 is also disposed between the linear portions 28c and 28d in the second direction Dy. The shield wiring 28 is not limited to a configuration in which the linear portions 28a, 28b, 28c, and 28d are continuously coupled together, and may have slits formed at portions thereof, or may be divided into a plurality of portions.

The shield wiring 28 is provided for each of the first electrodes 23. That is, the shield wiring 28 and the first electrodes 23 are each formed individually for each area surrounded by the signal lines SGL and the gate lines GCL and are provided in a matrix having a row-column configuration on the sensor base member 21. A first coupling line 28s1 couples together a plurality of pieces of the shield wiring 28 arranged in the first direction Dx. The first coupling line 28s1 extends in the first direction Dx and is provided so as to be aligned in a straight line with the linear portion 28d of the shield wiring 28.

A second coupling line 28s2 couples together a plurality of pieces of the shield wiring 28 arranged in the second direction Dy. The second coupling line 28s2 extends in the second direction Dy and is provided so as to be aligned in a straight line with the linear portion 28a of the shield wiring 28. A plurality of the first coupling lines 28s1 and a plurality of the second coupling lines 28s2 are provided in a grid pattern. At least either the first coupling lines 28s1 or the second coupling lines 28s2 are electrically coupled to the power supply circuit 103 (refer to FIG. 2). With this configuration, at least either the first coupling lines 28s1 or the second coupling lines 28s2 supply the reference signal COM to each of the shield wiring 28.

Figure 15:
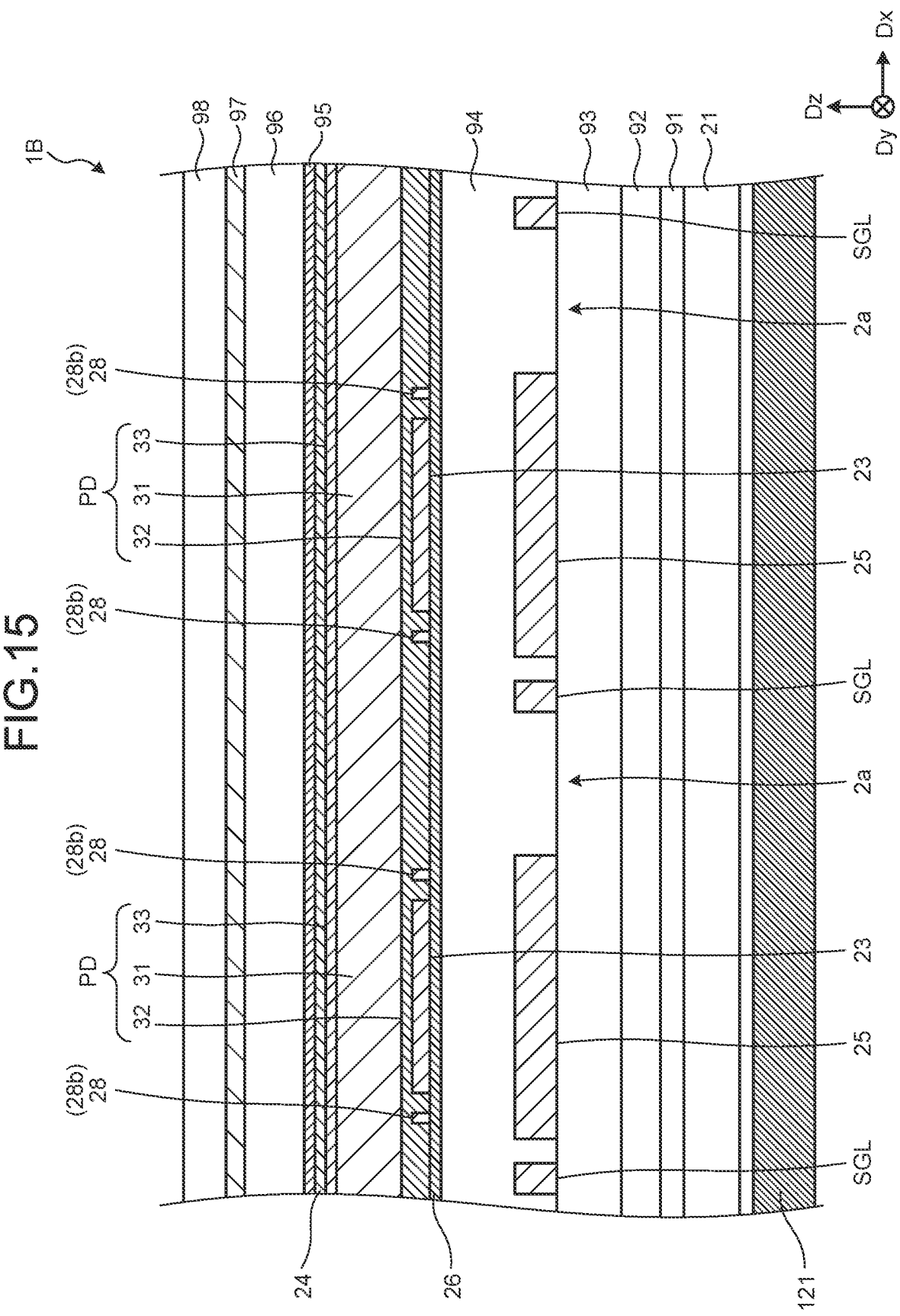
FIG. 15 is a XV-XV' sectional view of FIG. 14.

FIG. 15 is a XV-XV' sectional view of FIG. 14. As illustrated in FIG. 15, the first electrodes 23 and the shield wiring 28 are provided in the same layer on the barrier film 26. The electron transport layer 32, the active layer 31, and the hole transport layer 33 that form the photodiodes PD are continuously formed over the first electrodes 23 and the shield wiring 28. The electron transport layer 32 is provided so as to cover the upper and side surfaces of the first electrodes 23 and also to cover the shield wiring 28. In addition, the electron transport layer 32 is also provided in areas between the adjacent photodiodes PD that overlap neither the first electrodes 23 nor the shield wiring 28. That is, the electron transport layer 32, the active layer 31, and the hole transport layer 33 that form the photodiodes PD are provided over the light-blocking areas and the light-transmitting area 2a so as to cover the entire detection area AA of the array substrate 2.

In the light-transmitting area 2a, the light L1 of the light emitted from the backlight 121 passes through the electron transport layer 32, the active layer 31, and the hole transport layer 33 provided in the light-transmitting area 2a of the array substrate 2, and is emitted toward the object to be detected, such as the finger Fg. At this time, the photocarriers (holes or electrons) generated in the active layer 31 in the light-transmitting area 2a flow into the shield wiring 28. As a result, the shield wiring 28 can restrain the photocarriers generated in the light-transmitting area 2a from flowing into the first electrodes 23. Thus, by providing the shield wiring 28, the detection device 1B can reduce generation of noise in the photodiodes PD that would be caused by light other than light L2 due to the flow of the photocarriers generated by the light L2 from the object to be detected, such as the finger Fg, into the first electrodes 23.

The first electrode 23 and the shield wiring 28 are disposed so as to be separated at a distance SP (refer to FIG. 14). Resistance R between the first electrode 23 and the shield wiring 28 is expressed by the Expression (1) below. In Expression (1), Rs denotes the sheet resistance value of the electron transport layer 32, and W denotes the perimeter length of the first electrode 23. For example, when the first electrode 23 has a quadrilateral shape, the perimeter length of the first electrode 23 is the total length of the four sides of the first electrode 23.

$$R = Rs \times SP/W \tag{1}$$

When the distance SP has a length that satisfies Expression (2) below, the leakage current between the first electrode 23 and the shield wiring 28 can be reduced. In Expression (2), T denotes one frame period of detection (period in which the detection is performed in the entire detection area AA), and r denotes the allowable amount of reduction in the output voltage ($V_{out}$) of the photodiode PD (refer to FIG. 5). C denotes the capacitance generated between the first electrode 23 and the shield wiring 28.

$$RC/T\times(1-\exp(-T/RC))<1-r \qquad (2)$$

The area ratio of the area of the light receiving portion of the photodiode PD to the light-transmitting area 2a is preferably approximately 1:1. The area of the light receiving portions of the photodiodes PD is defined as the area overlapping the first electrodes 23 as described above and is smaller than the area of the light-blocking areas (light-blocking layers 25) and smaller than the area surrounded by the shield wiring 28. This configuration increases the use efficiency of the light L1 emitted from the backlight 121 and can improve the efficiency of the detection.

Fourth Embodiment

Figure 16:
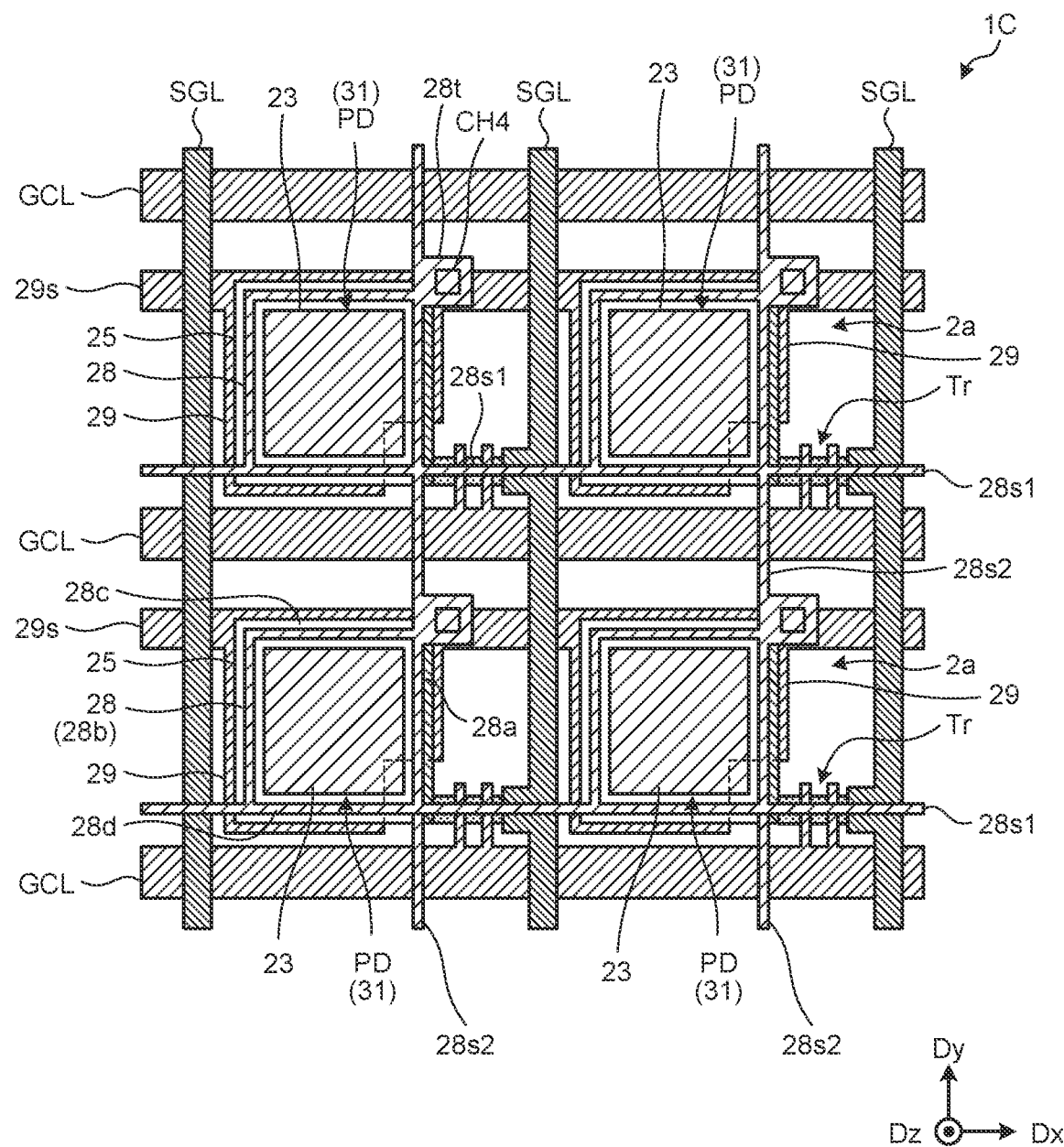
FIG. 16 is a magnified schematic configuration diagram of the sensor of a detection device according to a fourth embodiment.

FIG. 16 is a magnified schematic configuration diagram of the sensor of a detection device according to a fourth embodiment. As illustrated in FIG. 16, a detection device 1C according to the fourth embodiment further includes counter electrodes 29. Each of the counter electrodes 29 is provided so as to overlap the light-blocking layer 25. The counter electrode 29 is provided so as to also overlap the photodiode PD, the first electrode 23, and the shield wiring 28. The counter electrode 29 has a larger area than that of the light-blocking layer 25 in the plan view, except a portion provided with the first switching element Tr.

The counter electrode 29 is provided in the same layer as that of the gate line GCL. However, the counter electrode 29 is not limited thereto and may be provided in any layer that is a layer below the light-blocking layer 25 (layer between the light-blocking layer 25 and the sensor base member 21).

The counter electrode 29 is provided corresponding to each of the photodiodes PD. A coupling line 29s extending in the first direction Dx couples the counter electrodes 29 arranged in the first direction Dx. The coupling line 29s intersects the second coupling line 28s2 (linear portion 28a of the shield wiring 28). The shield wiring 28 is electrically coupled to the counter electrode 29 through a fourth contact hole CH4 provided in a tab 28t. This configuration supplies the same potential (reference signal COM) as that of the shield wiring 28 to the counter electrode 29.

In other words, the coupling line 29s is used as wiring that supplies the reference signal COM to the shield wiring 28. This configuration reduces the resistance of the wiring that supplies the reference signal COM to the shield wiring 28.

Capacitance is formed between the counter electrode 29 and the light-blocking layer 25 that are disposed so as to face each other. As described above, the light-blocking layer 25 is electrically coupled to the first electrode 23 and the photodiode PD. That is, the capacitance generated between the counter electrode 29 and the light-blocking layer 25 disposed so as to face each other is added to the sensor capacitance (capacitive element Ca (refer to FIG. 5)) formed in the photodiode PD. This configuration can increase the capacitance of the capacitive element Ca in the present embodiment.

In the first to the fourth embodiments described above, the first electrode 23 is the cathode electrode of the photodiode PD, and the second electrode 24 is the anode electrode of the photodiode PD. However, the present disclosure is not limited thereto. The first electrode 23 may be the anode electrode of the photodiode PD, and the second electrode 24 may be the cathode electrode of the photodiode PD. In this case, the photodiode PD is configured such that the hole transport layer 33 (first carrier transport layer), the active layer 31, and the electron transport layer 32 (second carrier transport layer) are stacked in the order in the direction orthogonal to the sensor base member 21.

While the preferred embodiments of the present invention have been described above, the present invention is not limited to the embodiments described above. The content disclosed in the embodiments is merely an example, and can be variously modified within the scope not departing from the gist of the present invention. Any modifications appropriately made within the scope not departing from the gist of the present invention also naturally belong to the technical scope of the present invention. At least one of various omissions, substitutions, and changes of the components can be made without departing from the gist of the embodiments described above and modifications thereof.

What is claimed is:
1. A detection device comprising:
   a substrate;
   a plurality of first electrodes arranged on a first principal surface of the substrate;
   a plurality of photodiodes provided corresponding to the first electrodes, and each comprising a first carrier transport layer, an active layer, and a second carrier transport layer;
   a second electrode provided across the photodiodes;
   a backlight provided on a second principal surface side opposite to the first principal surface of the substrate;
   a plurality of light-blocking layers provided between the backlight and the photodiodes; and
   a light-transmitting area formed between adjacent light-blocking layers of the light-blocking layers;
   a plurality of gate lines extending in a first direction; and
   a plurality of signal lines extending in a second direction, wherein
   a first distance, which is a distance of the light-transmitting area in the second direction between one of the light-blocking layers and one of the gate lines adjacent to the one of the light blocking layers in the second direction, is greater than a half of a distance of the first electrode in the second direction,
   a second distance, which is a distance of the light-transmitting area in the first direction between the one of the light-blocking layers and one of the signal lines adjacent to the one of the light blocking layers in the first direction, is greater than a half of a distance of the first electrode in the first direction, and
   the light-transmitting area is continuous and L-shaped.
2. The detection device according to claim 1, wherein, in an area overlapping each of the light-blocking layers, the first electrode, the first carrier transport layer, the active layer, the second carrier transport layer, and the second electrode are stacked in the order as listed, in a direction orthogonal to the first principal surface of the substrate.
3. The detection device according to claim 1, wherein
   the first carrier transport layer of each photodiode is provided so as to cover an upper surface and side surfaces of the first electrode provided for the photodiode,
   the active layer of the photodiode is provided so as to cover an upper surface and side surfaces of the first carrier transport layer of the photodiode, the second carrier transport layer of the photodiode is provided so as to cover an upper surface and side surfaces of the active layer of the photodiode, and the second electrode is provided so as to cover an upper surface and side surfaces of the second carrier transport layer of the photodiode.

4. The detection device according to claim 1, further comprising:

a plurality of switching elements provided corresponding to the photodiodes; and a plurality of gate lines and a plurality of signal lines coupled to the switching elements, wherein the first carrier transport layer, the active layer, and the second carrier transport layer that form each photodiode are formed individually for each area surrounded by the gate lines and the signal lines.

5. The detection device according to claim 1, wherein the first carrier transport layer of each photodiode is provided so as to cover side surfaces of the first electrode provided for the photodiode, the first carrier transport layer, the active layer, the second carrier transport layer, and the second electrode are stacked to have the same width, and the detection device further comprises an insulating film that covers side surfaces of each of the first carrier transport layer, the active layer, the second carrier transport layer, and the second electrode.

6. The detection device according to claim 5, further comprising:

a plurality of switching elements provided corresponding to the photodiodes; and a plurality of gate lines extending in a first direction and a plurality of signal lines extending in a second direction intersecting the first direction, the gate lines and the signal lines being coupled to the switching elements, wherein the first electrodes are formed individually for respective areas surrounded by the signal lines and the gate lines, the first carrier transport layer, the active layer, and the second carrier transport layer are continuously formed over the first electrodes arranged in the second direction, and the first carrier transport layers, the active layers, and the second carrier transport layers that form photodiodes adjacent in the first direction of the photodiodes are coupled together through a coupling portion provided so as to overlap a corresponding one of the gate lines.

7. The detection device according to claim 1, further comprising shield wiring provided so as to surround the first electrodes and configured to be supplied with a fixed potential, wherein the first carrier transport layer, the active layer, and the second carrier transport layer of each photodiode are provided so as to cover the shield wiring and the first electrode provided for the photodiode.

8. The detection device according to claim 7, wherein
the shield wiring is provided for each of the first electrodes, the detection device further comprises:

a first coupling line that extends in a first direction and couples together a plurality of pieces of the shield wiring adjacent in the first direction; and a second coupling line that extends in a second direction intersecting the first direction and couples together a plurality of pieces of the shield wiring adjacent in the second direction, and a plurality of the first coupling lines and a plurality of the second coupling lines are provided in a grid pattern.

9. The detection device according to claim 7, wherein the shield wiring is provided so as to overlap each of the light-blocking layers, and the shield wiring is disposed inside an outer perimeter of the light-blocking layer in a plan view in a direction orthogonal to the substrate.

10. The detection device according to claim 7, further comprising a counter electrode that is provided so as to overlap each of the light-blocking layers and is provided between the light-blocking layer and the substrate, wherein the counter electrode is electrically coupled to the shield wiring.

11. The detection device according to claim 7, further comprising:

a plurality of switching elements provided corresponding to the photodiodes; and a plurality of gate lines and a plurality of signal lines coupled to the switching elements, wherein the first electrodes are formed individually for respective areas surrounded by the signal lines and the gate lines, the shield wiring is formed individually for each of the areas surrounded by the signal lines and the gate lines, and the first carrier transport layer, the active layer, and the second carrier transport layer are continuously formed over the first electrodes and a plurality of pieces of the shield wiring.

12. The detection device according to claim 1, wherein each first electrode, the second electrode, or both are made of a light-transmitting conductive material.

13. The detection device according to claim 1, wherein each of the first electrodes is formed of a metal material.

14. The detection device according to claim 1, wherein an area ratio of light receiving portion of each of the photodiodes to the light-transmitting area is in a range from 0.8:1.0 to 1.0:0.8.

15. The detection device according to claim 1, wherein either each first electrode or the second electrode is a cathode electrode, and another of the first electrode and the second electrode is an anode electrode.

16. The detection device according to claim 1, further comprising a light guide portion provided so as to overlap the photodiodes, wherein the light guide portion comprises light guide paths, at least some of which overlapping the photodiodes, and comprises a light-blocking portion that has higher optical absorbance than that of the light guide paths.

17. The detection device according to claim 1, wherein the backlight is a flexible organic light-emitting diode (OLED) light source.

* * * * *